(12) United States Patent
Heo et al.

(10) Patent No.: US 12,401,047 B2
(45) Date of Patent: Aug. 26, 2025

(54) ELECTRODE STRUCTURE FOR SECONDARY BATTERY, METHOD OF MANUFACTURING THE SAME, AND SECONDARY BATTERY COMPRISING THE SAME

(71) Applicant: Samsung Electronics Co., Ltd., Suwon-si (KR)

(72) Inventors: Jinsuck Heo, Suwon-si (KR); Samuel Robert Cross, Burlington, MA (US); Kyounghwan Kim, Seoul (KR); Joungwon Park, Seongnam-si (KR); Jeongkuk Shon, Hwaseong-si (KR); Huisu Jeong, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 414 days.

(21) Appl. No.: 17/931,631

(22) Filed: Sep. 13, 2022

(65) Prior Publication Data

US 2023/0102903 A1 Mar. 30, 2023

Related U.S. Application Data

(60) Provisional application No. 63/245,303, filed on Sep. 17, 2021.

(30) Foreign Application Priority Data

Oct. 21, 2021 (KR) .................. 10-2021-0141364

(51) Int. Cl.
*H01M 4/80* (2006.01)
*H01M 4/02* (2006.01)
(Continued)

(52) U.S. Cl.
CPC .......... *H01M 4/801* (2013.01); *H01M 4/043* (2013.01); *H01M 4/0471* (2013.01);
(Continued)

(58) Field of Classification Search
CPC .... H01M 4/801; H01M 4/043; H01M 4/0471; H01M 4/131; H01M 4/62; H01M 2004/021; H01M 2004/028
See application file for complete search history.

(56) References Cited

U.S. PATENT DOCUMENTS 7,846,579 B2 12/2010 Krasnov et al.
8,192,789 B2 6/2012 Albano et al.
(Continued)

FOREIGN PATENT DOCUMENTS

JP 2012099405 A 5/2012
JP 2019140039 A 8/2019
(Continued)

OTHER PUBLICATIONS

Korean Office Action for Korean Patent Application No. 10-2021-0141364 dated Jun. 30, 2025.

*Primary Examiner* — Eugenia Wang
(74) *Attorney, Agent, or Firm* — CANTOR COLBURN LLP

(57) ABSTRACT

An electrode for a secondary battery includes a current collector; and an active material structure on the current collector, the activate material structure including: at least one first high-density layer, and at least one second high-density layer, the at least one second high-density layer being further away from the current collector as compared to the at least one first high-density layer; and a low-density layer between the at least one first high-density layer and the at least one second high-density layer, wherein a thickness
(Continued)

of the at least one second high-density layer is greater than a thickness of the at least one first high-density layer.

32 Claims, 19 Drawing Sheets

(51) Int. Cl.
*H01M 4/04* (2006.01)
*H01M 4/131* (2010.01)
*H01M 4/62* (2006.01)

(52) U.S. Cl.
CPC ...... *H01M 4/131* (2013.01); *H01M 2004/021* (2013.01); *H01M 2004/028* (2013.01); *H01M 4/62* (2013.01)

(56) References Cited

U.S. PATENT DOCUMENTS

| | | | |
|---|---|---|---|
| 8,597,722 B2 | 12/2013 | Albano et al. | |
| 8,900,743 B2 | 12/2014 | Kim et al. | |
| 8,906,449 B2 | 12/2014 | Li et al. | |
| 9,012,084 B2 | 4/2015 | Yada et al. | |
| 9,065,093 B2 | 6/2015 | Chiang et al. | |
| 9,979,043 B2 | 5/2018 | Yang et al. | |
| 10,147,944 B2 | 12/2018 | Cho et al. | |
| 10,177,372 B2 | 1/2019 | Park et al. | |
| 10,312,512 B2 | 6/2019 | Yang et al. | |
| 10,381,627 B2 | 8/2019 | Yang et al. | |
| 2007/0259271 A1 | 11/2007 | Nanno et al. | |
| 2010/0173204 A1 | 7/2010 | Sugiura et al. | |
| 2012/0009471 A1 | 1/2012 | Sugiura et al. | |
| 2012/0135292 A1 | 5/2012 | Buckingham et al. | |
| 2013/0017340 A1 | 1/2013 | Brown et al. | |
| 2016/0204464 A1 | 7/2016 | Cho et al. | |
| 2016/0226065 A1 | 8/2016 | Karabacak et al. | |
| 2021/0091419 A1 | 3/2021 | Kim et al. | |
| 2021/0202934 A1 | 7/2021 | Jeong et al. | |
| 2022/0293963 A1 | 9/2022 | Jeong et al. | |
| 2022/0328807 A1 | 10/2022 | Son et al. | |
| 2022/0407056 A1 | 12/2022 | Park et al. | |
| 2023/0317943 A1* | 10/2023 | Taniuchi | H01M 4/131 429/319 |

FOREIGN PATENT DOCUMENTS

| | | |
|---|---|---|
| KR | 1020100032053 A | 3/2010 |
| KR | 1020130115768 A | 10/2013 |
| KR | 1020180025685 A | 3/2018 |
| KR | 1020200119007 A | 10/2020 |
| KR | 1020200144395 A | 12/2020 |
| WO | 2006064774 A1 | 6/2006 |

* cited by examiner

ELECTRODE STRUCTURE FOR SECONDARY BATTERY, METHOD OF MANUFACTURING THE SAME, AND SECONDARY BATTERY COMPRISING THE SAME

CROSS-REFERENCE TO RELATED APPLICATIONS

This application claims priority to U.S. Provisional Application No. 63/245,303, filed on Sep. 17, 2021, in the US Patent and Trademark office, and Korean Patent Application No. 10-2021-0141364, filed on Oct. 21, 2021, in the Korean Intellectual Property Office, under 35 U.S.C. § 119 and the benefits accruing therefrom, the contents of which are incorporated by reference herein in their entirety.

BACKGROUND

1. Field

The present disclosure relates to an electrode for a secondary battery, a method of manufacturing the same, and a secondary battery including the same.

2. Description of the Related Art

Secondary batteries refer to batteries that are chargeable and dischargeable, unlike non-chargeable primary batteries, and are widely used in a variety of electronic devices such as mobile phones, laptop computers, and camcorders. In particular, a lithium secondary battery has the advantage of a high energy density per volume as compared to non-chargeable primary batteries, and demands for lithium secondary batteries are growing.

With diversifying types of electronic devices that use secondary batteries and the growth of related markets, there is an increasing need for further performance improvements for secondary batteries in various aspects, such as in terms of energy density, high-rate capability, stability and durability, and securing flexibility. Energy density is associated with the capacity increase of secondary batteries, and high-rate capability is associated with improvement in the charging and discharging rates of secondary batteries. In recent years, research on high-capacity secondary batteries using an electrode having a three-dimensional structure is also in progress.

SUMMARY

One or more embodiments include an electrode with improved performance and a method of manufacturing the same.

One or more embodiments include a secondary battery including the electrode, thus having improved performance.

Additional aspects will be set forth in part in the description which follows and, in part, will be apparent from the description, or may be learned by practice of the presented embodiments of the disclosure.

According to one or more embodiments, provided is an electrode for a secondary battery, including: a current collector; and an active material structure on the current collector, the active material structure including: at least one first high-density layer, and at least one second high-density layer, the at least one second high-density layer being further away from the current collector as compared to the at least one first high-density layer; and a low-density layer between the at least one first high-density layer and the at least one second high-density layer, wherein a thickness of the at least one second high-density layer is greater than a thickness of the at least one first high-density layer.

The at least one first high-density layer may include a primary first high-density layer and a secondary first high-density layer, the low-density layer may be between the primary first high-density layer and the secondary first high-density layer, and the primary first high-density layer and the secondary first high-density layer can have a same thickness or a different thickness. A thickness ratio of a thickness of the primary first high-density layer or the secondary first high-density layer to a thickness of each layer of the low-density layer may be from about 1:0.1 to about 1:0.3.

The at least one first high-density layer may include a primary first high-density layer, a secondary first high-density layer, and a tertiary first high-density layer, the low-density layer may be between the primary first high-density layer and the secondary first high-density layer, and between the secondary first high-density layer and the tertiary first high-density layer, and at least two of the primary first high-density layer, the secondary first high-density layer, and the tertiary first high-density layer may have a same thickness or a different thickness.

A thickness ratio of a thickness of the primary first high-density layer, the secondary first high-density layer or the tertiary first high-density layer to a thickness of each layer of the low-density layer may be from about 1:0.1 to about 1:0.3.

The at least one second high-density layer may include a primary second high-density layer and a secondary second high-density layer, the low-density layer may be between the primary second high-density layer and the secondary second high-density layer, and the primary second high-density layer and the secondary second high-density layer can have a same thickness or a different thickness. A thickness ratio of a thickness of the primary second high-density layer or the secondary second high-density layer to a thickness of each layer of the low-density layer may be from about 1:0.1 to about 1:0.3.

The at least one second high-density layer may include a primary second high-density layer, a secondary second high-density layer, and a tertiary second high-density layer, the low-density layer may be between the primary second high-density layer and the secondary second high-density layer, and between the secondary second high-density layer and the tertiary second high-density layer, and at least two of the primary second high-density layer, the secondary second high-density layer, and the tertiary second high-density layer may have a same thickness or a different thickness.

A thickness ratio of a thickness of the primary second high-density layer, the secondary second high-density layer or the tertiary second high-density layer to a thickness of each layer of the low-density layer may be from about 1:0.1 to about 1:0.3.

According to one or more embodiments, provided is a method of manufacturing an electrode for a secondary battery, the method including: forming a structure by pressing a stack including providing at least one first high-density layer, a low-density layer, and at least one second high-density layer; disposing the low-density layer between the at least one first high-density layer and the at least one second high-density layer to form a stack; pressing the stack to form a structure; sintering the structure to manufacture an active material structure; and disposing a current collector on the active material structure and proximate to the at least one first high-density layer to manufacture the electrode.

The method may further include, before the sintering, forming a plurality of channels extending in the thickness direction of the electrode. The sintering may include sintering at a temperature of about 1000° C. to about 1300° C.

According to one or more embodiments, provided is a secondary battery including: a first electrode; a second electrode on the first electrode; and a separator between the first electrode and the second electrode, wherein at least one of the first electrode or the second electrode is the electrode described above.

Also provided is a cathode, wherein the cathode is the electrode describe above, and at least one of the first high-density layer, the second high-density layer, or the low-density layer comprises a cathode active material.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
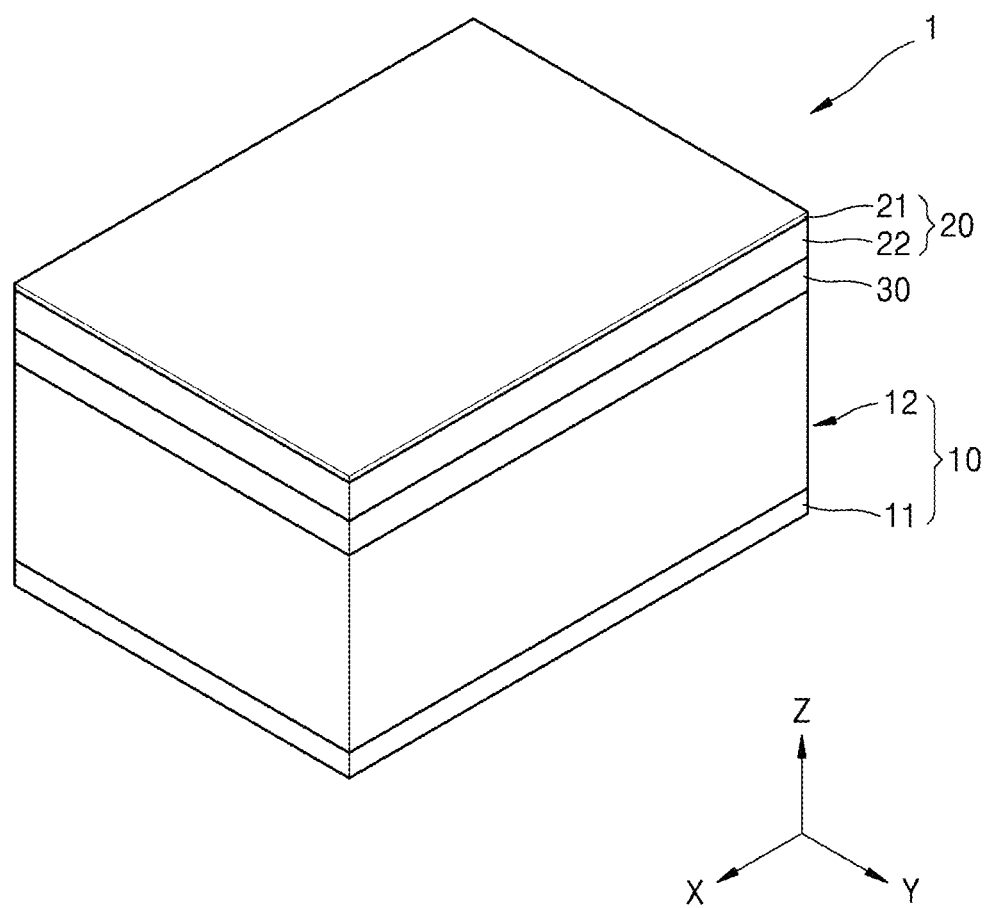
FIG. 1A is a perspective view of an embodiment of a secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of an electrode structure, a method of manufacturing the same, and a secondary battery including the same will be described with reference to the accompanying drawings.

Hereinafter, the expressions "on the upper portion" of an element or "on" an element may be construed as meaning not only directly on the element and but also above the element in a non-contact manner. In contrast, when an element is referred to as being "directly on" another element, there are no intervening elements present.

As used herein, the singular forms "a", "an" and "the" are intended to include the plural forms as well, unless the context clearly indicates otherwise. In addition, when a certain element "comprises," "includes," or "has" a certain component or portion, this may be construed as further including, rather than excluding, other components, unless specifically stated otherwise.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

In a sintered electrode composed of only an active material without a conductive material and a binder, the migration of lithium ions can be limited depending on the thickness of the electrode. In the case of an electrode composed of an active material monolayer, lithium ion migration can be slow and lithium ion diffusivity may be lower than in a liquid electrolyte, and it can be difficult to increase the thickness of the sintered electrode in order to obtain suitable high-rate capability. In addition, due to non-uniform current densities, the utilization of the electrode may be limited to a select region, and thus, lifetime characteristics of a secondary battery having the electrode can deteriorate. To address these and other problems, it is desired to develop an electrode (also referred to as "electrode structure") that allows easy lithium ion migration to achieve a uniform current density and increase the utilization of the electrode, or uniformity of the utilization.

Thus, to solve the problems described above, the present inventors have discovered an electrode having a layered structure in which a plurality of active material layers are stacked on a current collector to have selected density and thickness gradients that provide expected improvement in the migration of lithium ions in an electrode.

According to one or more embodiments, provided is an electrode for a secondary battery, including: a current collector; and an active material structure on the current collector, the active material structure including: at least one first high-density layer and at least one second high-density layer, the at least one second high-density layer being further away from the current collector as compared to the at least one first high-density layer; and a low-density layer between the at least one first high-density layer and the at least one second high-density layer, wherein a thickness of at least one second high-density layer is greater than a thickness of the at least one first high-density layer.

The low-density layer may be stacked so as to serve as a pathway (channel) that facilitates migration of lithium ions from the first high-density layer to the second high-density layer.

To maximize lithium ion migration, the thickness of a high-density active material layer that is the furthest away from a counter electrode may be minimized to improve uniformity in current density in the electrode, thus improving rate capability. In addition, the thickness of the second high-density layer is formed to be greatest in the thickness direction (e.g., a direction from the current collector to a counter electrode, or a direction orthogonal to a major surface of the current collector) to increase the overall electrode thickness with a thickness structure of the active material structure capable of facilitating lithium ion diffusion in the electrode, so that a secondary battery having greater energy density may be manufactured. In addition, through creation of uniform current density over the entire electrode during charging and discharging, the utilization of the active material structure in high-rate conditions is improved, so that the lifespan of a secondary battery including such an electrode may be improved.

As used herein, the first high-density layer and the second high-density layer refer to active material layers having high density and low porosity. The first high-density layer and the second high-density layer may each independently has a solid content, excluding pores or the like, of about 90 volume percent (vol %) to about 98 vol %, about 92 vol % to about 98 vol %, or about 95 vol % to about 97 vol %, based on a total volume of the first or second high density layer respectively. Here, the solid content may be, for example, an active material content.

As used herein, the low-density layer refers to an active material layer having low density and low porosity, and may have a solid content, excluding pores or like, of about 50 vol % to about 75 vol %, about 52 vol % to about 72 vol %, or about 55 vol % to about 70 vol %, based on a total volume of the low-density layer. Here, the solid content may be, for example, an active material content.

The electrode according to one or more embodiments may have high-density layers that are different in density and thickness with a structure in which a high-density layer farther from the current collector has a greater thickness than a high-density layer closer to the current collector. In the electrode having this structure, the overall electrode thickness may be increased by having the disclosed active material layer that facilitates lithium ion diffusion in a bulk sintered electrode, and a secondary battery having greater energy density characteristics may be manufactured. In addition, the migration of lithium ions may be improved and current density uniformity in an electrode may be improved, and thus high-rate capabilities may be improved. Thus, the electrode according to one or more embodiments has a structure capable of providing an improved combination of rate capability and energy density at the same time, and may overcome a thickness limitation of the electrode.

The electrode according to an embodiment may include the at least one first high-density layer which includes a 1-1st high-density layer (also referred to as "primary first high-density layer") and a 1-2nd high-density layer (also referred to as secondary first high-density layer), wherein a low-density layer is between the 1-1st high-density layer and the 1-2nd high-density layer. The 1-1st high-density layer and the 1-2nd high-density layer may have a same thickness or different thicknesses. A thickness ratio of a thickness of the 1-1st high-density layer or the 1-2nd high-density layer to a thickness of the second high-density layer may be greater than about 1:1 and less than or equal to about 1:5, from about 1:2 to about 1:4, or from about 1:2 to about 1:3.

In an embodiment, the 1-1st high-density layer and the 1-2nd high-density layer may have a same thickness. In other embodiments, when the 1-1st high-density layer and the 1-2nd high-density layer may have different thicknesses, and a thickness ratio of a thickness of the 1-1st high-density layer to a thickness of the 1-2nd high-density layer may be larger than about 1:1 and less than or equal to about 1:2, or may be from about 1:1 to about 1:2.

In the electrode according to one or more embodiments, the at least one first high-density layer may include a 1-1st high-density layer, a 1-2nd high-density layer, and a 1-3rd high-density layer (also referred to as "tertiary first high-density layer"). A primary low-density layer may be between the 1-1st high-density layer and the 1-2nd high-density layer; and a secondary low-density layer may be between the 1-2nd high-density layer and the 1-3rd high-density layer, and at least two of the 1-1st high-density layer, the 1-2nd high-density layer, and the 1-3rd high-density layer may have a same thickness or different thicknesses. A thickness ratio of a thickness of the 1-1st high-density layer, the 1-2nd high-density layer, or the 1-3rd high-density layer to a thickness of each layer of the at least one second high-density layer may be larger than about 1:1 and less than or equal to about 1:5, and may be from about 1:2 to about 1:4 or from about 1:2 to about 1:3.

In an embodiment, when the thicknesses of the 1-1st high-density layer, the 1-2nd high-density layer, and the 1-3rd high-density layer are not all the same, the thickness of the 1-1st high-density layer and the thickness of the 1-2nd high-density layer may be the same, and the 1-3rd high-density layer may be stacked to have a greater thickness than those of the 1-1st high-density layer and the 1-2nd high-density layer. A thickness ratio of a thickness of the 1-1st high-density layer, to the thickness of the 1-2nd high-density layer, to a thickness of the 1-3rd high-density layer may be greater than about 1:1:1 and less than or equal to about 1:1:2, and may be, for example, about 1:1:2.

When the thicknesses of the 1-1st high-density layer, the 1-2nd high-density layer, and the 1-3rd high-density layer are all different, a thickness ratio of a thickness of the 1-1st high-density layer, to a thickness of the 1-2nd high-density layer, and to a thickness of the 1-3rd high-density layer may be, for example, about 1:2:3.

In the electrode according to one or more embodiments, a thickness ratio of a total thickness of the at least one first high-density layer to a total thickness of the at least one second high-density layer may be from about 1.5:1 to about 1:6. In embodiments, the thickness ratio may be about 1.5:1, about 1:1, about 1:2, about 1:2.5, or about 1:6. A thickness ratio of a thickness of each of the at least one first high-density layer to a thickness of the low-density layer may be from about 1:0.1 to about 1:0.3, and a thickness ratio of a thickness of each of the at least one second high-density layer to a thickness of the low-density layer may be from about 1:0.1 to about 1:0.3.

The low-density layer may include a single layer or a plurality of layers, and a thickness of each layer of the low-density layer may be from about 2 μm to about 5 μm, for example, about 2.5 μm to about 4.5 μm. When the thickness of the low-density layer is within these ranges, the electrode with improved density may be manufactured.

The thickness of each layer of the at least one first high-density layer may be from about 8 μm to about 40 μm, about 10 μm to about 40 μm, or about 15 μm to about 35 μm, and the thickness of each layer of the at least one second high-density layer may be from about 10 μm to about 40 μm, or from about 15 μm to about 35 μm. The thicknesses of each layer of the at least one first high-density layer and each layer of the at least one second high-density layer may each independently be from about 10 μm to about 40 μm. When the thicknesses of the first high-density layers and the second high-density layers are within the above ranges, lithium ion pathways may be smoothly formed, and thus, a secondary battery with improved rate capability and capacity characteristics may be manufactured.

In the electrode for a secondary battery according to one or more embodiments, the second high-density layer may include a 2-1st high-density layer (also referred to as "primary second high-density layer") and a 2-2nd high-density layer (also referred to as "secondary second high-density layer"), and a low-density layer may be between the 2-1st high-density layer and the 2-2nd high-density layer. The 2-1st high-density layer and the 2-2nd high-density layer may have a same thickness or different thicknesses.

A thickness ratio of a thickness of the 2-1st high-density layer or the 2-2nd high-density layer to a thickness of each layer of the low-density layer may be from about 1:0.1 to about 1:0.3. When the thickness ratio of a thickness of the 2-1st high-density layer or the 2-2nd high-density layer to a thickness of each layer of the low-density layer is within this range, a secondary battery with improved rate capability and capacity characteristics may be manufactured.

The second high-density layer may include a 2-1st high-density layer, a 2-2nd high-density layer, and a 2-3rd high-density layer (also referred to as "tertiary second high-density layer"), and a low-density layer may be arranged between the 2-1st high-density layer and the 2-2nd high-density layer, and between the 2-2nd high-density layer and the 2-3rd high-density layer. Herein, at least two of the 2-1st high-density layer, the 2-2nd high-density layer, and the 2-3rd high-density layer may have a same thickness or different thicknesses.

A thickness ratio of a thickness of the 1-1st high-density layer, the 1-2nd high-density layer or the 1-3rd high-density layer to a thickness of each layer of the at least one second high-density layer may be larger than about 1:1 and less than or equal to about 1:5, and may be, for example, from about 1:2 to about 1:4. When the thickness ratio of a thickness of the 1-1st high-density layer, the 1-2nd high-density layer or the 1-3rd high-density layer, to a thickness of each layer of the at least one second high-density layer is within these ranges, lithium ion migration may be maximized and lithium ion diffusion may be facilitated.

The thickness of the 2-1st high-density layer and the thickness of the 2-2nd high-density layer may be the same, and the thickness of the 2-3rd high-density layer may be different therefrom. A thickness ratio of a thickness of the 2-1st high-density layer or the 2-2nd high-density layer to a thickness of the 2-3rd high-density layer may be, for example, from about 1:1.5 to about 1:3, or from about 1:1.5 to about 1:2. When the thicknesses of the 2-1st high-density layer, the 2-2nd high-density layer, and the 2-3rd high-density layer are different, a thickness ratio of a thickness of 2-1st high-density layer, to a thickness of the 2-2nd high-density layer, to a thickness of the 2-3rd high-density layer may be, for example, about 1:2:3, about 1:2:2, or about 1:3:3. When the thicknesses ratio of the 2-1st high-density layer, the 2-2nd high-density layer, and the 2-3rd high-density layer is within these ranges, current density uniformity in an electrode may be improved, and a secondary battery with improved rate capability may be manufactured.

A thickness ratio of a thickness of the 2-1st high-density layer, the 2-2nd high-density layer or the 2-3rd high-density layer, to a thickness of each layer of the low-density layer may be from about 1:0.1 to about 1:0.3. When the thickness ratio of a thickness of the 2-1st high-density layer, the 2-2nd high-density layer or the 2-3rd high-density layer, to a thickness of each layer of the low-density layer is within this range, current density uniformity in the electrode may be improved.

In the electrode according to one or more embodiments, a total number of layers of the at least one first high-density layer and the at least one second high-density layer may be, for example, 3 or more, for example 3 to 6, 3 to 5, or may be 3 or 4. The electrode may allow lithium ion pathways to be smoothly formed, may facilitate charging and discharging at high rates, and may improve capacity characteristics.

In the electrode according to one or more embodiments, the outermost at least one second high-density layer may have the greatest thickness among each layer of the at least one first high-density layer, each layer of the at least one second high-density layer, and each layer of the low-density layer. In the electrode according to one or more embodiments, the outermost layer in the at least one second high-density layer may have the greatest thickness.

In the electrode according to one or more embodiments, the thickness of the low-density layer may not have a significant effect of improving high rate characteristics, but can affect an electrode density. Accordingly, a plurality of low-density layers may be formed to have a same thickness, and the thickness thereof may need to be maintained within a certain thickness range to increase the electrode density of the entire electrode. Thus, a secondary battery with the electrode structure may have high energy density and improved rate capability.

In the electrode according to one or more embodiments, a thickness ratio of a thickness of the first high-density layer to a thickness of the second high-density layer may be larger than about 1:1 and less than or equal to about 1:5, and may be, for example, from about 1:2 to about 1:4, or from about 1:2 to about 1:3. As used herein, the thickness of the first high-density layer refers to the thickness of the first high-density layer having a single layer structure, and the thickness of the second high-density layer refers to the thickness of the second high-density layer having a single layer structure. A thickness ratio of the total thickness of at least one first high-density layer to the total thickness of at least one second high-density layer may be from about 1.5:1 to about 1:6, about 1:1 to about 1:5, or about 1:2 to about 1:4.

In the electrode according to other embodiments, a thickness ratio between the first high-density layer and the low-density layer may be from about 1:0.1 to about 1:0.3, and a thickness ratio between the second high-density layer and the low-density layer may be from about 1:0.1 to about 1:0.3. As used herein, the thicknesses of the first high-density layer and the second high-density layer refer to the thicknesses of the first high-density layer and the second high-density layer each having a single layer structure. When the thickness ratio of a thickness of the first high-density layer or the second high-density layer to a thickness of the low-density layer is within the above range, a secondary battery with excellent energy density and rate capability at the same time may be manufactured. The low-density layer may include at least one of a solid electrolyte, a liquid electrolyte, or an ionic liquid. When the low-density layer includes these components, the migration of lithium ions of the first high-density layer and the second high-density layer may be further improved.

A porosity of the at least one first high-density layer may be about 1% to about 5% with respect to a total volume of the at least one first high-density layer, and a porosity of the at least one second high-density layer may be about 1% to about 5% with respect to a total volume of the at least one second high-density layer. In addition, a porosity of the low-density layer may be about 25% to about 50% with respect to a total volume of the low-density layer. When the porosities of the at least one first high-density layer, the at least one second high-density layer, and the low-density layer are within these ranges, a secondary battery with excellent energy density and rate capability at the same time may be manufactured. As used herein, % as a porosity unit may indicate vol %.

In the present specification, the porosity may be measured by analysis such as scanning electron microscopy, a mercury pressing method, a transmission electron microscopy (TEM), or the like, or cross-sectional analysis of particles using focused ion beams (FIBs).

In one or more embodiments, the active material structure may have a plurality of channels extending in a thickness direction. When the channels are present, metal ion pathways in which lithium ions can move may be formed.

The channels may be formed by a plurality of first through-holes and a plurality of second through-holes spaced apart from the first through-holes and aligned in a first direction (z direction).

The first through-holes may pass through the first high-density layer in the first direction and may be spaced apart from each other at certain intervals along a surface of the first high-density layer. The second through-holes may pass through the second high-density layer in the first direction and may be spaced apart from each other at certain intervals along a surface of the second high-density layer. The first through-holes may be pass through the low-density layer in the first direction and may be spaced apart from each other at certain intervals along a surface of the low-density layer.

The plurality of channels may contain at least one of a solid electrolyte, an ionic liquid, or a liquid electrolyte.

The plurality of channels may include first channels and second channels, and the first channels are empty spaces and the second channels may contain a solid electrolyte.

The active material structure may have a plurality of channels extending in the thickness direction, the plurality of channels may contain a solid electrolyte, and the low-density layer may include a low-density active material and a solid electrolyte.

The active material structure may have a plurality of channels extending in the thickness direction, and a plurality of low-density layers separated by the plurality of channels may have different compositions.

The electrode may be a sintered electrode having a relative density of about 85% to about 99%, for example, about 90% to about 98%. When the electrode has a relative density as described above, and excellent density and high electrical conductivity may be obtained. When the relative density of the electrode is outside of these ranges, due to lack of density, electronic conductivity may be reduced.

In the present specification, the relative density may be calculated by measuring the dimensions and weight of a sample. The relative density may be, for example, a sintered density. The relative density and sintered density may be evaluated using a general Archimedes specific gravity measurement method, and a relative density of 100% may represent a theoretical density.

FIG. 1A is a schematic perspective view showing an embodiment of a structure of a secondary battery.

Referring to FIG. 1A, a secondary battery 1 according to an embodiment may include: a first electrode 10; a second electrode 20; a separator 30 between the first electrode 10 and the second electrode 20; and a liquid electrolyte impregnated in the separator 30.

The separator 30 may block contact between the first electrode 10 and the second electrode 20 and prevents a short circuit. In addition, the separator 30 may allow ionic conduction but block electronic conduction between the first electrode 10 and the second electrode 20.

At least one of the first electrode 10 or the second electrode 20 may include the electrode according to one or more embodiments. The first electrode 10 and the second electrode 20 may be, for example, a cathode and an anode, respectively.

In the electrode according to one or more embodiments, the at least one first high-density layer may include a plurality of layers, and a low-density layer may be interposed between the plurality of layers. The plurality of layers may each have a same thickness. In addition, the second high-density layer or each layer of the at least one second high-density layer may have a thickness greater than the thickness of each of the at least one first high-density layers.

In the electrode according to one or more embodiments, the first high-density layer and the second high-density layer may each include a plurality of layers, and a low-density layer may be interposed between the plurality of layers. Each layer of the first high-density layer may have a same thickness, and each layer of the second high-density layer may have a same thickness.

The first high-density layer and the second high-density layer may each include a plurality of layers, and the low-density layer may be interposed between the plurality of layers. Herein, each layer of the first high-density layer may have a same thickness, and each layer of the second high-density layer may have a different thickness.

The first high-density layer may be a single layer, and the second high-density layer may include a plurality of layers, and each layer of the second high-density layer may have a same thickness.

In one or more embodiments, the first high-density layer may be a single layer, and the second high-density layer may include a plurality of layers, and a low-density layer may be interposed between the plurality of layers. Each layer of the second high-density layer may have a different thickness. In other embodiments, the second high-density layer may have a thickness gradually increasing in the thickness direction.

In the electrode according to one or more embodiments, the at least one first high-density layer may include a first layer, a second layer, and a third layer each having a same thickness, and the second high-density layer may be a single layer.

In the electrode according to other embodiments, the at least one first high-density layer may include a first layer and a second layer each having a same thickness, and the second high-density layer may include a first layer and a second layer each having a same or different thickness.

In the electrode according to other embodiments, the at least one first high-density layer may include a single layer, and the second high-density layer may include a first layer, a second layer, and a third layer each having a same thickness.

Embodiments of the electrode for a secondary battery will be described in greater detail with reference to the accompanying drawings.

The electrode ay have a layered structure in which the first high-density layer, the second high-density layer, and the low-density layer may have different densities and thicknesses.

Figure 2:
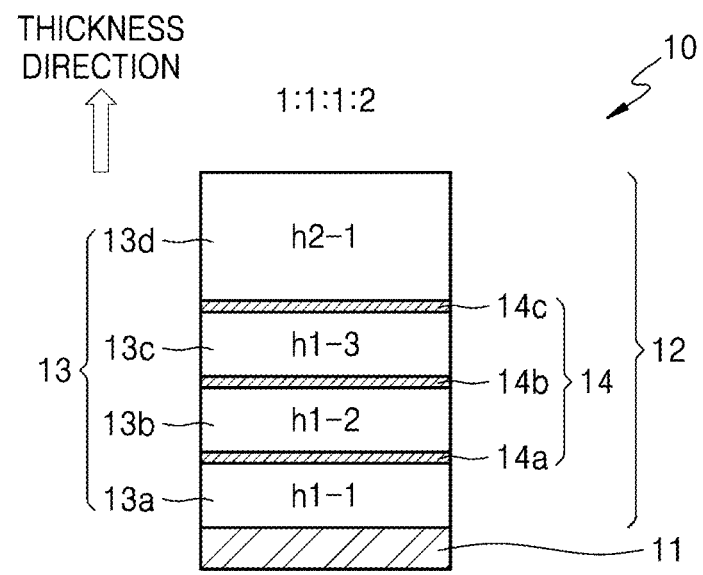
FIGS. 2 to 6 are schematic views showing the embodiments of the structures of electrodes.

Referring to FIG. 2, an electrode 10 according to an embodiment may include: a current collector 11 and an active material structure 12 which is arranged on the current collector 11 and includes a high-density layer 13 and a low-density layer 14.

The high-density layer 13 may be stacked in a direction away from the current collector 11, and may include a first high-density layer and a second high-density layer stacked on the current collector 11. The high-density layer 13 may have a structure in which a 1-1st high-density layer (h1-1) 13a, a 1-2nd high-density layer (h1-2) 13b, a 1-3rd high-density layer (h1-3) 13c, and a second high-density layer (h2-1) 13d are sequentially stacked one another. In the active material structure 12, the thickness of the second high-density layer 13d, which is a high-density layer arranged in the thickness direction (a direction from the current collector to a counter electrode), may be greater than the thickness of each of the 1-1st high-density layer 13a, the 1-2nd high-density layer 13b, and the 1-3rd high-density layer 13c which constitute the first high-density layer. When this thickness gradient is provided, the diffusion and migration of lithium ions may be maximized, and uniform current density in the electrode may be ensured.

The second high-density layer 13d may have a single layer structure as shown in FIG. 2, and the first high-density layer may have a three-layer structure, and the 1-1st high-density layer (h1-1) 13a, the 1-2nd high-density layer (h1-2) 13b, and the 1-3rd high-density layer (h1-3) 13c of the first high-density layer may have a same thickness.

The low-density layer 14 may include a first low-density layer (L-1) 14a, a second low-density layer (L-1) 14b, and a third low-density layer (L-1) 14c which may have a same density or different densities. The first low-density layer (L-1) 14a, the second low-density layer (L-2) 14b, and the third low-density layer (L-3) 14c may be respectively interposed between the 1-1st first high-density layer (h1-1) 13a and the 1-2nd first high-density layer (h1-2) 13b, between the 1-2nd first high-density layer (h1-2) 13b and the 1-3rd first high-density layer (h1-3) 13c, and between the 1-3rd first high density layer (h1-3) 13c and the 2-1 second high-density layer (h2-1) 13d. The first low-density layer (L-1) 14a, the second low-density layer (L-2) 14b, and the third low-density layer (L-3) 14c may have a same thickness as shown in FIG. 2, and may be stacked to serve as pathways (channels) for facilitating migration of lithium ions from the high-density layer.

A thickness ratio of a thickness of the 1-1st first high-density layer (h1-1) 13a, to the thickness of the 1-2nd first high-density layer (h1-2) 13b, to a thickness of the 1-3rd first high-density layer (h1-3) 13c, and to a thickness of the second high-density layer may be, for example, 1:1:1:2, as shown in FIG. 2.

Figure 3:
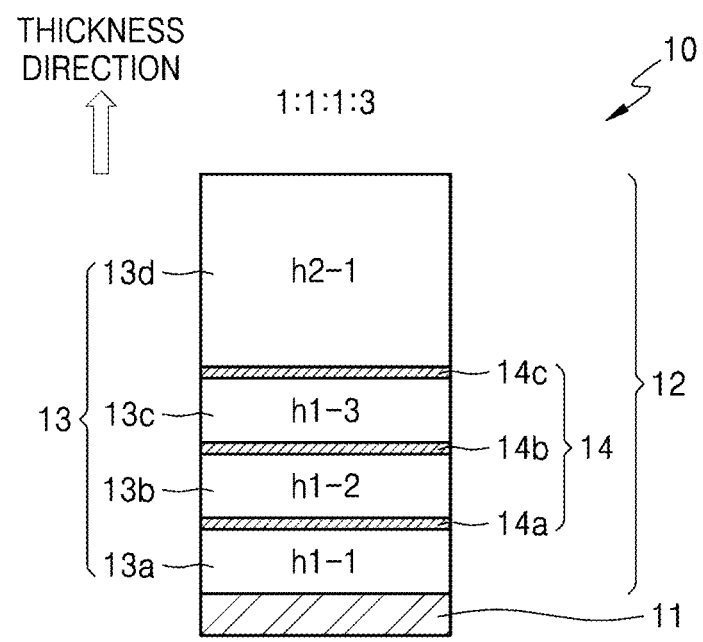

The electrode structure of FIG. 3 may include the 1-1st high-density layer (h1-1) 13a, the 1-2nd high-density layer (h1-2) 13b, the 1-3rd high-density layer (h1-3) 13c, and the second high-density layer 13d. The electrode of FIG. 3 may have the same stacked layer structure as the electrode of FIG. 2, except that the thickness of the second high-density layer (h2-1) 13d is controlled to be three times the thickness of each of the 1-1st high-density layer 13a, the 1-2nd high-density layer 13b, and the 1-3rd high-density layer 13c which constitute the first high-density layer.

Figure 4:
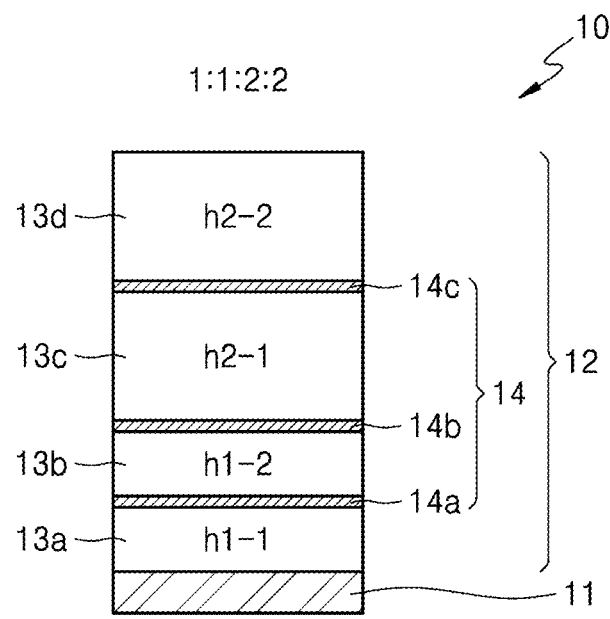

An electrode of FIG. 4 may include, as the first high-density layer, the 1-1st high-density layer (h1-1) 13a and the 1-2nd high-density layer (h1-2) 13b in a two-layer structure, and a second high-density layer may be stacked thereon. The second high-density layer may include, as a two-layer structure, the 2-1st high-density layer (h2-1) 13c and the 2-2nd high-density layer (h2-2) 13d. The 1-1st high-density layer (h1-1) 13a and the 1-2nd high-density layer (h1-2) 13b may have a same thickness as shown in FIG. 4, and the 2-1st high-density layer (h2-1) 13c and the 2-2nd high-density layer (h2-2) 13d may have a same thickness.

The thickness of each of the 2-1st high-density layer 13c and the 2-2nd high-density layer 13d may be greater than that of each of the 1-1st high-density layer (h1-1) 13a and the 1-2nd high-density layer (h1-2) 13b, for example, by onefold or twofold. Therefore, a thickness ratio of a thickness of the 1-1st high-density layer (h1-1) 13a, to a thickness of the 1-2nd high-density layer (h1-2) 13b, to a thickness of the 2-1st high-density layer (h2-1) 13c, and to a thickness of the 2-2nd high-density layer (h2-2) 13d may be about 1:1:2:2.

Figure 5:
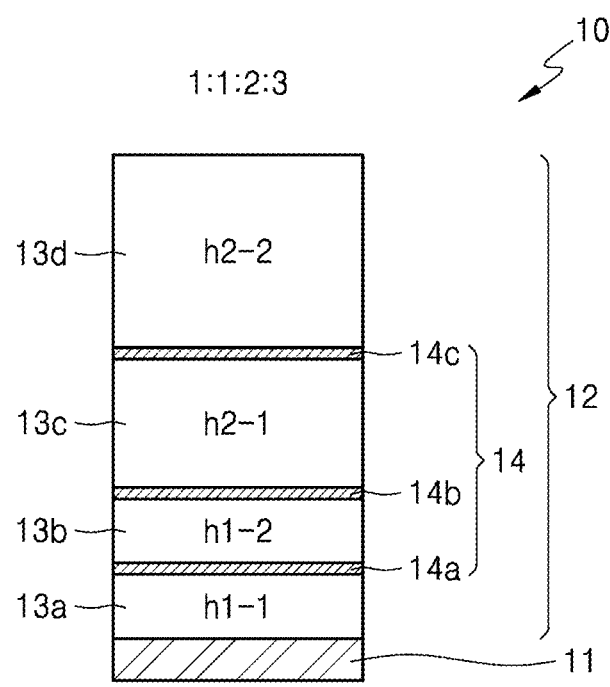

As in the case of FIG. 4, an electrode of FIG. 5 may include a 1-1st high-density layer (h1-1) 13a and a 1-2nd high-density layer (h1-2) 13b as a two-layer structure, and a 2-1st high-density layer (h2-1) 13c and a 2-2nd high-density layer (h2-2) 13d as a two-layer structure. The electrode of FIG. 5 may have the same stacked structure as that of the electrode of FIG. 4, except that a thickness ratio of a thickness of the 2-1st high-density layer (h2-1) 13c to a thickness of the 2-2nd high-density layer (h2-2) 13d is about 2:3.

Figure 6:
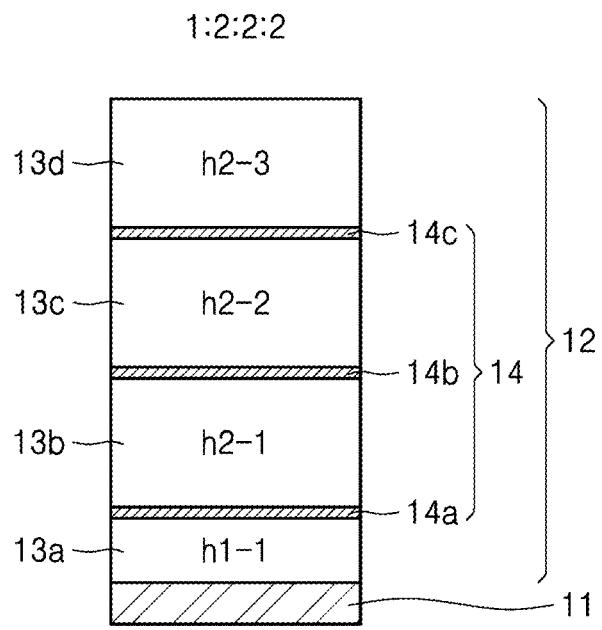

An electrode of FIG. 6 may include a first high-density layer (h1-1) 13a as a single layer, and a 2-1st high-density layer (h2-1) 13b, a 2-2nd high-density layer (h2-2) 13c, and a 2-3rd high-density layer (h2-3) 13d as a three-layer structure. The low-density layer 14 may be formed between the first high-density layer (h1-1) 13a and the 2-1st high-density layer (h2-1) 13b as layer 14a, between the 2-1st high-density layer (h2-1) 13b and the 2-2nd high-density layer (h2-2) 13c as layer 14b, and between the 2-2nd high-density layer (h2-2) 13c and the 2-3rd high-density layer (h2-3) 13d as layer 14c, to have a same thickness as shown in FIG. 6. In FIG. 6, a thickness ratio of a thickness of the first high-density layer 13a and, as a three-layer structure, to a thickness of the 2-1st high-density layer (h2-1) 13b, to a thickness of the 2-2nd high-density layer (h2-2) 13c, and to a thickness of the 2-3rd high-density layer (h2-3) 13d may be about 1:2:2:2.

The low-density layers of FIGS. 2 to 6 may each include a low-density active material or may include a low-density active material and a solid electrolyte. Here, a content of the solid electrolyte may be controlled to be within a range from about 0.1 vol % to about 10 vol %, or a range from about 0.5 vol % to about 5 vol % based on the total volume of the low-density layer.

Figure 7:
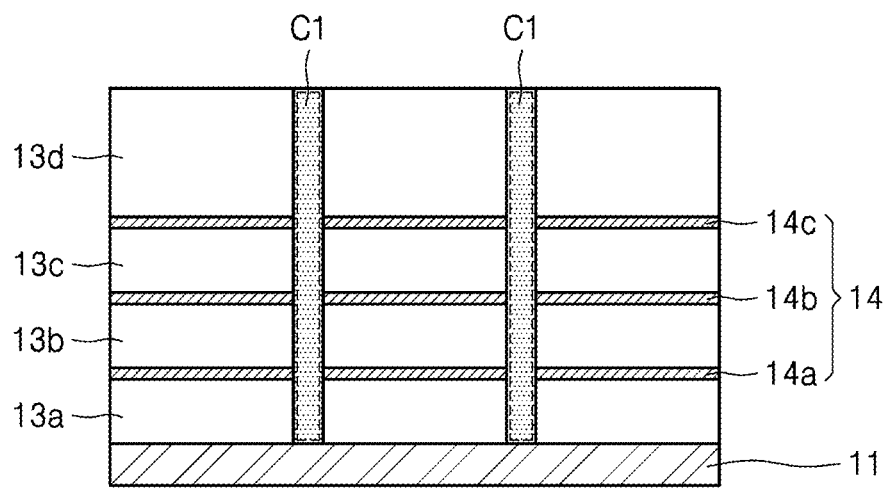
FIGS. 7 to 10 are schematic views showing the embodiments of the structures of electrodes having a plurality of channels.

An electrode of FIG. 7 may have a structure with a plurality of channels (C1) extending in the thickness direction. A solid electrolyte may be disposed in the channels (C1).

Figure 8:
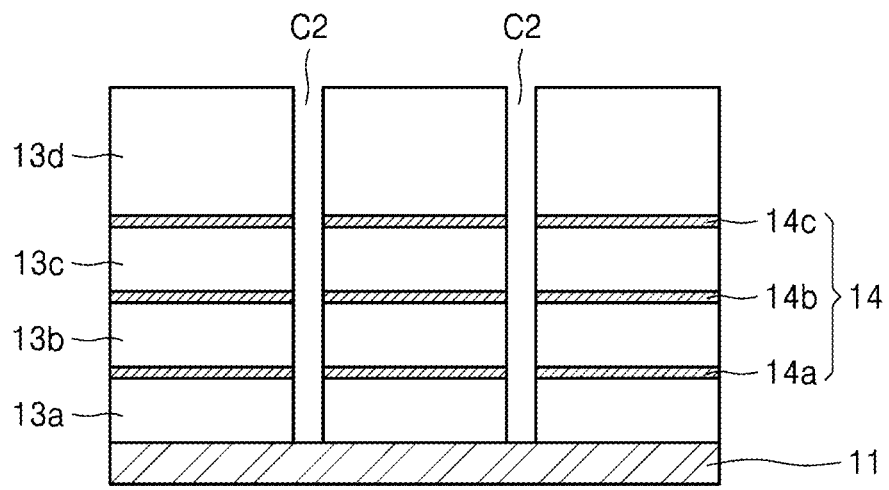

An electrode of FIG. 8 may have a plurality of channels (C2) extending in the thickness direction, wherein the channels (C2) are formed in a vertical direction and each include an empty space. A liquid electrolyte may be disposed in the empty space.

Figure 9:
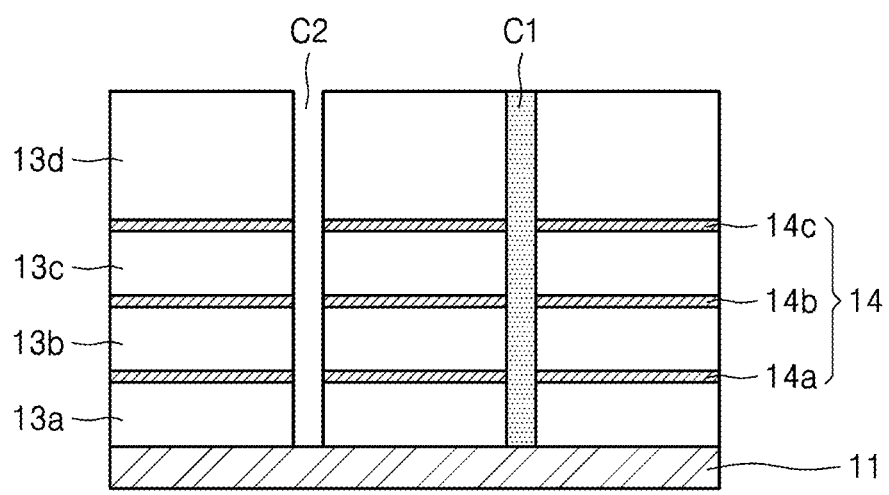

An electrode of FIG. 9 may have a plurality of channels extending in the thickness direction, wherein the channels may include a channel (C1) and a channel (C2), the channel (C1) may be provided with a solid electrolyte, and the channel (C2) may be composed of an empty space.

Figure 10:
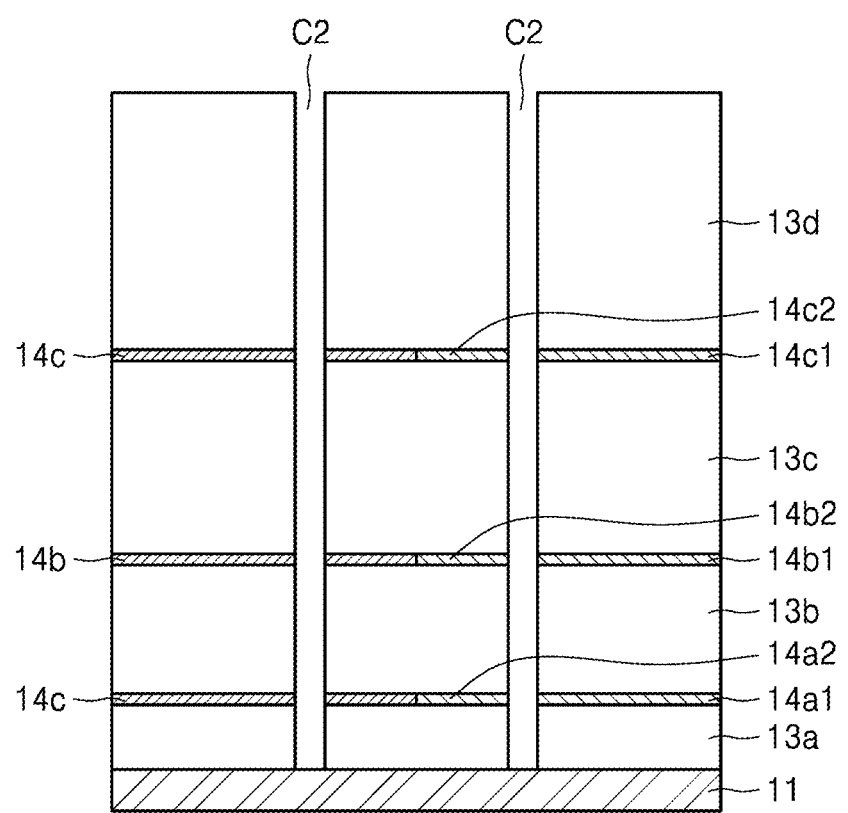

An electrode according another embodiment may have channels (C2), wherein the channels (C2) may be composed of empty spaces. The low-density layer may include low-density layers having different compositions, as shown in FIG. 10. For example, first low-density layers 14a, 14b, and 14c may be formed in a partial region of the low-density layer, and second low-density layers 14a1, 14b1, and 14c1 may be formed in another partial region of the low-density layer. In another region of the low-density layer, as shown in FIG. 10, third low-density layers 14a2, 14b2, and 14c2 may be formed.

For example, the first low-density layers 14a, 14b, and 14c may contain a low-density active material, and the second low-density layers 14a1, 14b1, and 14c1 may contain a low-density active material and a solid electrolyte. A partial region of the third low-density layers 14a2, 14b2, and 14c2 may contain only a low-density active material, and another partial region thereof may contain a low-density active material and a solid electrolyte.

The low-density layers may contain a low-density active material and at least one of a liquid electrolyte, or an ionic liquid electrolyte, or a solid electrolyte. When the low-density layers have different compositions as described above, current density uniformity in the electrode may be further improved.

The solid electrolyte may be at least one selected from a sulfide-based solid electrolyte or an oxide-based solid electrolyte.

The sulfide-based solid electrolyte may be, for example, at least one selected from $Li_2S$—$P_2S_5$, $Li_2S$—$P_2S_5$—LiX (wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$-LiI, $Li_2S$—$B_2S_3$, $Li_2S$—$P_2S_5$—$Z_mS_n$, (wherein m and n are each independently a positive number, and Z is at least one of Ge, Zn, or Ga), $Li_2S$—$GeS_2$, $Li_2S$—$SiS_2$—$Li_3PO_4$, $Li_2S$—$SiS_2$-$Li_pMO_q$ (wherein p and q are each independently a positive number, and M is one of P, Si, Ge, B, Al, Ga, or In), $Li_{7-x}PS_{6-x}Cl_x$ (wherein $0 \leq x \leq 2$), $Li_{7-x}PS_{6-x}Br_x$ (wherein $0 \leq x \leq 2$), or $Li_{7-x}PS_{6-x}I_x$ (wherein $0 \leq x \leq 2$).

The oxide-based solid electrolyte may be, for example, a Garnet-based ceramic ($Li_{3+x}La_3M_2O_{12}$, wherein M may be at least one of Te, Nb, or Zr, and x is an integer from x to 10), lithium phosphorus oxynitride ($Li_xPO_yN_z$, wherein $0<x<1$, $0<y<1$, and $0<z<1$) (LiPON), $Li_xP_yO_zN_k$ (wherein $2.7 \leq x \leq 3.3$, $0.8 \leq y \leq 1.2$, $3.5 \leq z \leq 3.9$, and $0.1 \leq k \leq 0.5$), $Li_wPO_x$-$N_yS_z$ (wherein $0<w<1$, $0<x<1$, $0<y<1$, and $0.1<z<1$), $Li_{1+x+y}Al_xTi_{2-x}Si_yP_{3-y}O_{12}$ (wherein $0<x<2$ and $0 \leq y<3$), $BaTiO_3$, $Pb(Zr_xTi_{1-x})O_3$ (PZT)($0 \leq x \leq 1$), $Pb_{1-x}La_xZr_{1-y}Ti_yO_3$ (PLZT) (wherein $0 \leq x<1$, and $0 \leq y<1$), $Pb(Mg_{3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$), lithium lanthanum titanate ($Li_xLa_yTiO_3$, wherein $0<x<2$ and $0<y<3$), lithium germanium thiophosphate (LixGeyPzSw, wherein $0<x<4$, $0<y<1$, $0<z<1$, and $0<w<5$), lithium nitride-based glass ($Li_xN_y$, wherein $0<x<4$ and $0<y<2$), $SiS_2$ ($Li_xSi_yS_z$, wherein $0<x<3$, $0<y<2$, and $0<z<4$), $P_2S_5$-based glass ($Li_xP_yS_z$, wherein $0<x<3$, $0<y<3$, and $0<Z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, a Garnet-based ceramic ($Li_{3+x}La_3M_2O_{12}$, wherein M is at least one of Te, Nb, or Zr, and x may be an integer from 1 to 10), or a combination thereof. As the oxide-based solid electrolyte, for example, a Garnet-based oxide-based solid electrolyte having excellent reduction stability when in contact with a lithium anode may be used. For example, as the oxide-based solid electrolyte, a Garnet-based ceramic ($Li_{3+x}La_3M_2O_{12}$)(wherein M may be at least one of Te, Nb, or Zr, and x may be an integer of 1 to 10), for example, LLZO ($Li_{6.5}La_3Zr_{1.5}Ta_{0.5}O_{12}$), may be used.

A method of manufacturing the electrode structure according to one or more embodiments will be described.

First, the electrode structure according to one or more embodiments may be manufactured by: forming a structure by pressing a stack including at least one first high-density layer, a low-density layer, and at least one second high-density layer; sintering the structure to manufacture an active material structure; and laminating the current collector to the active material structure.

The stack including the at least one first high-density layer, the low-density layer, and the at least one second high-density layer may be, for example, a green sheet including at least one first high-density layer, a low-density layer, and at least one second high-density layer.

The active material structure may be bound to the current collector using a binder. After coating the binder on the current collector, the active material obtained according to the above-described process may be bound thereto.

Before the sintering of the structure, a plurality of channels which extend in a thickness direction may be formed. When forming the plurality of channels, laser drilling may be used.

The sintering may be performed at about 1000° C. to about 1400° C., about 1000° C. to about 1300° C., or about 1000° C. to about 1200° C. During the sintering, a cathode active material contained in an active material sheet may be sintered. Through the sintering, only the active material remains in the electrode, while the rest is carbonized and disappears during the sintering.

Through the above-described processes, the first high-density layer and the second high-density layer may be provided as an active material sheet containing about 90% to about 98% of the cathode active material. In addition, through the above-described processes, the low-density layer may be provided as a cathode material sheet containing about 50% to about 75% of the cathode active material.

The pressing may be performed by, for example, isostatic pressure. The isostatic pressure may be, for example, cold isostatic pressure (CIP) or warm isostatic pressure (WIP). Through the pressing, the sheets are compressed.

The method may further include, after the step of laminating the current collector to the active material structure, forming a plurality of channels extending in the thickness direction of the structure.

The plurality of channels may be formed using a laser drilling method.

The plurality of channels may include, for example, first through-holes and second through-holes. Here, the plurality of first through-holes and the plurality of second through-holes may have a diameter of about 2 μm to about 30 μm, for example, about 5 μm to about 25 μm, about 10 μm to about 25 μm, or about 12 μm to about 24 μm, and may have an interval of about 10 μm to about 150 μm, about 20 μm to about 120 μm, or about 30 μm to about 100 μm.

A solid electrolyte having high ionic conductivity may be disposed in the plurality of channels. When the solid electrolyte is used, a secondary battery with improved energy density and rate capability may be manufactured.

The step of forming the structure; the step of sintering the structure to manufacture an active material structure, and/or in the step of laminating the current collector to the active material structure may further include forming a plurality of channels extending in the thickness direction of the structure.

In the method of manufacturing the electrode according to one or more embodiments, the green sheet may be formed by tape casting a composition for forming the first high-density layer, the second high-density layer, and the low-density layer, for example, a slurry containing an active material, a binder, a plasticizer, and a solvent.

The active material may be, for example, a cathode active material or an anode active material, and may be any material available as a cathode active material or anode active material of a secondary battery.

A particle size of the active material contained in the composition for forming the first high-density layer and the second high-density layer may be several hundreds nanometers, for example, about 100 nanometers (nm) to about 900 nm, about 100 nm to about 800 nm, or about 200 nm to about 500 nm. A particle size of the active material contained in the composition for forming the low-density layer may be, for example, several micrometers, for example, about 1 micrometers (μm) to about 20 μm, about 1 μm to about 15 μm, or about 1 μm to about 10 μm. As used herein, the particle size means an average particle diameter when the active material is spherical, and indicates the length of the longer axis when the active material is non-spherical.

The electrode according to one or more embodiments may have a uniform relative density and a uniform electrode density. The electrode according to one or more embodiments may be a sintered electrode having a relative density of about 85% to about 99%.

The electrode according to an embodiment may be a cathode, and may include a cathode current collector and an active material structure formed thereon.

According to one or more embodiments, provided is a secondary battery including: a first electrode structure; a second electrode; and a separator between the first electrode and the second electrode structure, wherein at least one of the first electrode or the second electrode is the electrode described above.

The secondary battery including the electrode according to an embodiment may have a ratio of discharge capacity (1C)/discharge capacity (0.2C) of about 90% to about 95% and an energy density of about 500 watt-hours per liter (Wh/L) to about 605 Wh/L. The secondary battery may have a capacity retention after 400 charge-discharge cycles of about 88% to about 90%. The capacity retention after 400 charge-discharge cycles may be obtained in the same manner as in Evaluation Example 2, except that charge-discharge cycles are performed 400 times, instead of 351 times, in total.

The secondary battery according to one or more embodiments has the electrode as described above, and thus, has a uniform current density despite an increased electrode thickness, a high energy density, high-rate capabilities and lifetime characteristics as described above, and the secondary battery is suitable for mobile and wearable devices, and can be used as an electric vehicle battery when made with a large area.

The electrode for the secondary battery according to one or more embodiments may have a uniform charge and discharge current density over the entire active material structure, which improves migration of lithium ions, and thus, a secondary battery with improved high-rate capabilities may be manufactured.

The first electrode may be a cathode, and the second electrode may be an anode.

In one or more embodiments, the first electrode may include at least one active material structure and a current collector. The first electrode may include, for example, a cathode active material structure and a cathode current collector.

The cathode current collector 11 may have a planar shape, and for example, may be a current collecting plate. In one or more embodiments, the cathode current collector may be arranged to face a surface of the at least one active material structure. The cathode current collector may include, for example, at least one conductive material selected from Cu, Au, Pt, Ag, Zn, Al, Mg, Ti, Fe, Co, Ni, Ge, In, or Pb. The cathode current collector may be a metal layer, but may also be a layer composed of a non-metal conductive material.

In one or more embodiments, the second electrode 20 may include an anode layer 22 and an anode current collector 21. The anode layer 22 may be an anode active material structure which is provided as a planar shape and includes an anode active material.

In one or more embodiments, a composition for forming the anode layer 22 may further include a binder, a conductive material, and/or a thickener, in addition to the anode active material.

The anode current collector 21 may be arranged to face a surface of the anode layer 22 and electrically connected to the anode layer 22. Here, the anode current collector 21 may be arranged to face the cathode current collector 11. In one or more embodiments, the anode current collector 21 may be a copper foil, a nickel foil, a stainless steel foil, a titanium foil, a nickel foam, a copper foam, a polymer substrate coated with a conductive material, or a combination thereof. However, embodiments of the present disclosure are not limited thereto.

The separator 30 may separate the first electrode 10 and the second electrode 20 and provide a migration path for lithium ions, and may be any separator commonly used in lithium batteries. That is, any separator which has low resistance against migration of electrolyte ions and excellent electrolyte material retention ability may be used. For example, the separator may be selected from glass fiber, polyester, polyethylene (PE), polypropylene (PP), polytetrafluoroethylene (PTFE), or a combination thereof. The separator 30 may be a non-woven fabric or a woven fabric. The separator may be, for example, a polyolefin-based polymer separator, such as a polyethylene or polypropylene separator, or may be a coated separator that includes at least a ceramic component or polymer substance to ensure heat resistance or mechanical strength. The separator may have a single layer structure or multilayer structure.

As described above, when the secondary battery 1, in which the cathode active material layer 12, which is at least one three-dimensional active material structure, is disposed on the cathode current collector 11, is prepared, the capacity and energy density of the secondary batter 1 may increase compared to a secondary battery including a two-dimensional (i.e., a planar structured) active material structure.

In one or more embodiments, the at least one three-dimensional active material structure may have a higher active material volume fraction and a larger reaction area than a planar-type active material plate, and thus, may be advantageous in improving the energy density and high-rate capabilities of the secondary battery.

To prevent degradation of the energy density and rate capability of the secondary battery 1, an electrolyte material having high ionic conductivity may be disposed in the channels.

A porous substrate of the separator is a porous membrane including polyolefin. For example, the porous substrate may be a membrane comprising or consisting of a resin, for example, polyolefins, such as polyethylene, polypropylene, polybutene, polyvinyl chloride, and mixtures or copolymers thereof.

The porous substrate may include, for example, polyolefins, such as polyethylene, polypropylene, or the like, and may be a multilayer of at least two layers. The porous substrate may be a mixed multilayer membrane, for example, a polyethylene/polypropylene two-layer separator, a polyethylene/polypropylene/polyethylene three-layer separator, or a polypropylene/polyethylene/polypropylene three-layer separator.

In one or more embodiments, the porous substrate may include polyethylene, polypropylene, or a combination thereof, the porous substrate may have a thickness of about 1 μm to about 100 μm, or about 5 μm to about 90 μm, or about 10 μm to about 90 μm, the porous substrate may have a porosity of about 5% to about 95% or about 10% to about 90%, and the porous substrate may have a pore size of about 0.01 μm to about 20 μm, or about 0.1 μm to about 10 μm, or about 0.5 μm to about 5 μm. The thickness of the porous substrate may be, for example, about 1 μm to about 30 μm, about 5 μm to about 20 μm, or about 5 μm to about 15 μm. The porosity of the porous substrate may be, for example, about 10% to about 85%. The pore size of the porous substrate of the separator may be about 0.01 μm to about 20 μm, or about 0.01 μm to about 10 μm. When the thickness, the pore size, and the porosity of the porous substrate are within the above ranges, the secondary battery may have excellent mechanical properties without increase in internal resistance.

A first coating layer including ceramic particles and a binder may be disposed on the porous substrate. For example, the ceramic particles may include inorganic particles of at least one selected from alumina ($Al_2O_3$), boehmite, $BaSO_4$, MgO, $Mg(OH)_2$, clay, silica ($SiO_2$), $TiO_2$, ZrO, CaO, attapulgite, or $10SiO_2$-$2Al_2O_3$—$Fe_2O_3$-2MgO.

Non-limiting examples of the binder are polyvinyl alcohols, sulfonate-based compounds, acrylamide-based compounds, (meth)acrylic compounds, acrylonitrile-based compounds, derivatives thereof, copolymers thereof, mixtures thereof, or combinations thereof. The binder may be at least one selected from polyvinyl alcohol, poly(acrylic acid-co-acrylamide-co-2-acrylamido-2-methylpropanesulfonic acid) sodium salt, poly(acrylic acid-co-acrylamide-co-acrylamido sulfonic acid), or salts thereof. The first coating layer may have a thickness of about 0.1 μm to about 5.0 μm or about 0.5 μm to about 2 μm.

The average size of the ceramic particles may be about 1 μm to about 20 μm, about 1.1 μm to about 18 μm, about 3 μm to about 16 μm, or about 5 μm to about 15 μm. Here, the average size means the average length. The average size and aspect ratio may be confirmed with a scanning electron microscope. The separator with the first coating layer including the ceramic particles and the binder may be formed by coating and drying a ceramic coating layer composition, which includes the ceramic particles and a solvent, on the porous separator. The coating may be performed by a method, for example, printing, roller coating, blade coating, dipping coating, spray coating, or the like.

The secondary battery according to one or more embodiments may be, for example, a secondary battery for mobile or wearable devices. An anode of the secondary battery may have improved capacity through pre-lithiation, thus having an energy density of 600 Wh/L or more.

The secondary battery according to one or more embodiments may be a lithium secondary battery. The lithium secondary battery may be, for example, a lithium ion secondary battery.

Figure 1B:
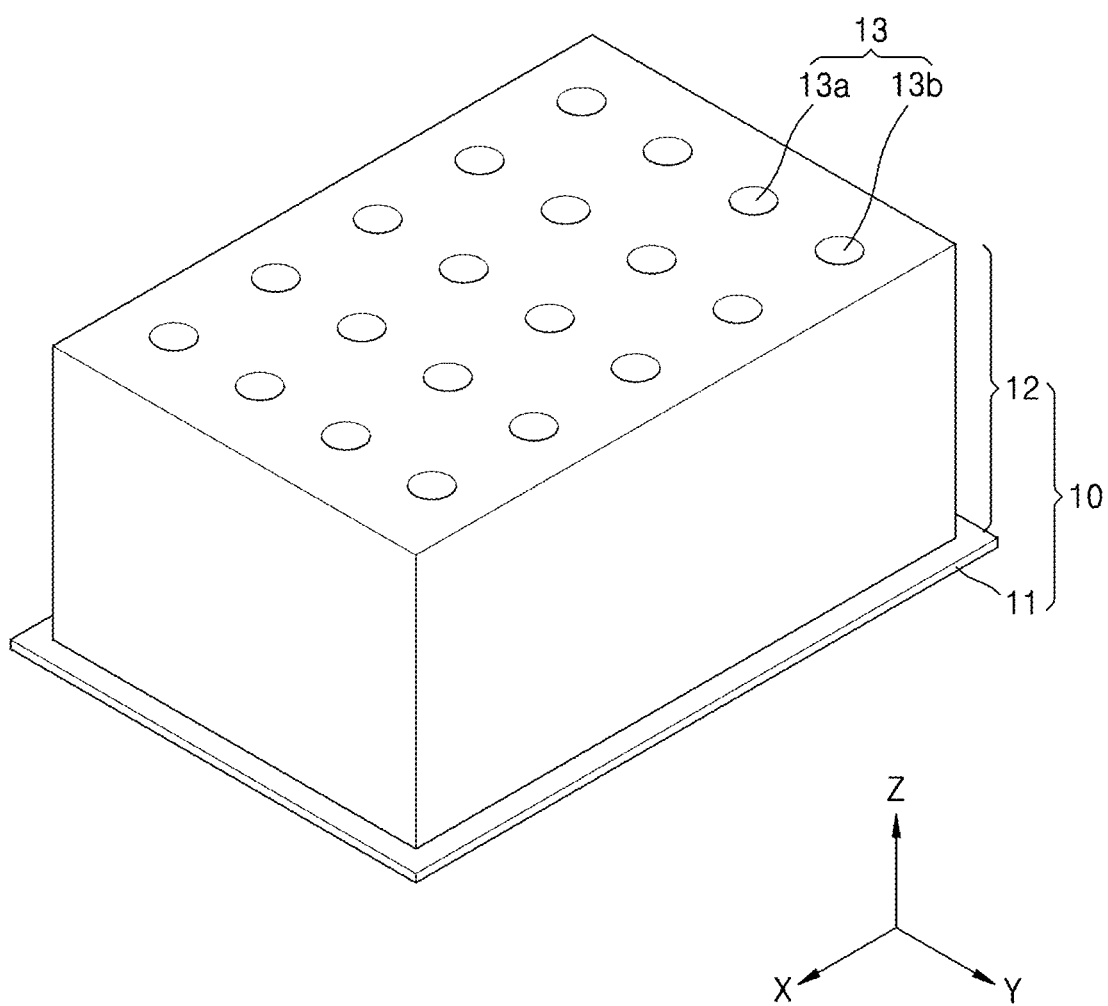
FIG. 1B is a schematic perspective view showing an embodiment of a structure of a cathode.
Figure 1C:
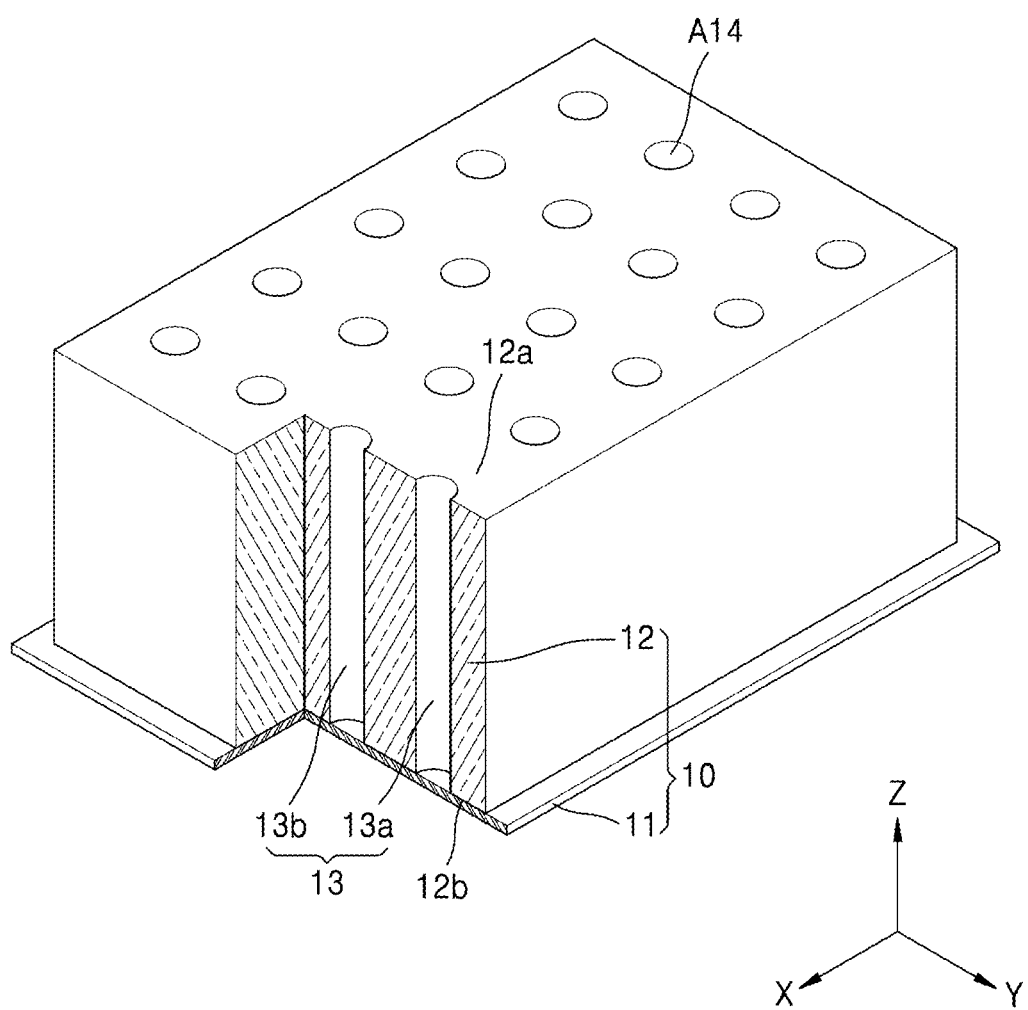
FIG. 1C is a partial cutaway view of the cathode shown in FIG. 1B.

FIGS. 1B and 1C are schematic perspective views showing embodiments of a structure of a secondary battery.

FIG. 1B is a perspective view of a cathode of the secondary battery of FIG. 1A, and FIG. 1C is a cross-sectional view of an embodiment of a cathode active material layer having a channel structure.

Referring to FIGS. 1B and 1C, the cathode active material layer 12, which is an active material structure having a channel structure 13, may have a three-dimensional structure. The secondary battery, which includes the cathode active material layer 12 having a three-dimensional structure, may have significantly improved capacity and energy density, compared to a secondary battery which includes a cathode active material layer having a two-dimensional structure (i.e., a planar structure). The three-dimensional cathode active material layer 12 may have an increased cathode active material volume fraction and a larger reaction area, compared to a planar cathode active material layer. Therefore, there may be advantages in improving the energy density and high-rate capabilities of the secondary battery.

Referring to FIGS. 1B and 1C, the three-dimensional cathode active material layer 12 may further include the channel structure 13 extending from one surface 12a of the cathode active material layer 12 toward the other surface 12b of the cathode active material layer 12.

As the cathode active material layer 12 includes the channel structure 13, a reaction area of the cathode active material layer 12 may increase. In addition, as the cathode active material layer 12 includes the channel structure 13, an electrolyte (not shown) may also be disposed in the cathode active material layer 12 after battery assembly, and thus, ion conduction pathways may be remarkably increased in the cathode active material layer 12. Therefore, the secondary battery having a cathode 10, which includes the cathode active material layer 12 having the channel structure 13, may have improved rate capability and cycle characteristics.

The channel structure 13 included in the cathode active material layer 12 may include, for example, through-holes extending from one surface 12a to the other surface 12b of the cathode active material layer 12. As the channel structure 13 includes the through-hole, lithium ions may be easily conducted into an inner portion of the cathode active material layer adjacent to the cathode current collector 11. As a result, non-uniform current distribution between a region adjacent to one surface 12a of the cathode active material layer and a region adjacent to the other surface 12b of the cathode active material layer 12 may be inhibited.

For example, the area (A14) occupied by one or more channels 13a and 13b with respect to a total area of one surface 12a of the cathode active material layer, measured along one surface perpendicular to the thickness direction (z direction) of the cathode active material layer, may be about 1% to about 15%, about 1% to about 10%, or about 1% to about 5%. If the area (A14) occupied by the one or more channels 13a and 13b excessively increases, the energy density of the battery may be reduced. When the area (A14) occupied by the one or more channels 13a and 13b is within the ranges described above, effects from introduction of the channels may be excellent.

The diameter (D) of the one or more channels 13a and 13b included in the cathode active material layer 12 may be, for example, about 2 μm to about 30 μm, for example, about 10 μm to about 25 μm, or about 12 μm to about 24 μm. When the diameter of the channels is within these ranges, cycle characteristics of the secondary battery including the cathode may be further improved.

The pitch (P), i.e., the separation distance between the plurality of channels 13a and 13b included in the cathode active material layer 12 may be, for example, about 10 μm to about 150 μm, about 20 μm to about 120 μm, or about 30 μm to about 100 μm. As the separation distance between the plurality of channels is within these ranges, cycle characteristics of the secondary battery including the cathode may be further improved.

Referring to FIG. 1B, the area occupied by the plurality of through-holes, measured on a surface perpendicular to the thickness direction (Z direction) of the cathode active material layer, with respect to a total area of one surface 12a of one cathode active material layer, may be, for example, from about 1% to about 15%, from about 1% to about 10%, or from about 1% to about 5%. When the area occupied by the plurality of through-holes excessively increases, the energy density of the battery may reduce. When the area occupied by the plurality of through-holes is excessively reduced, it may be difficult for the effect of channel introduction to occur.

An anode 20 may be manufactured as follows. For example, an anode active material, a conductive material, a binder, and a solvent may be mixed to prepare an anode active material composition. The anode active material composition may be directly coated on an anode current collector 21 and dried to form the anode 20 having an anode active material layer 22 disposed on the anode current collector 21. In other embodiments, the anode 20 may be manufactured by casting the prepared anode active material composition on a separate support to form an anode active material layer 22, and separating the anode active material layer 22 from the support, and laminating the anode active material layer 22 on an anode current collector 21.

The anode current collector 21 may include a conductive metal such as Cu, Au, Pt, Ag, Zn, Al, Mg, Ti, Fe, Co, Ni, Ge, In, Pd, stainless steel, or the like. However, embodiments are not necessarily limited thereto, and any material used as an anode current collector in the art may be used. For example, the anode current collector 21 may be a copper foil.

The anode active material may be, for example, an alkali metal (e.g., lithium, sodium, or potassium), an alkaline earth metal (e.g., calcium, magnesium, or barium), and/or a certain transition metal (e.g., zinc), or an alloy thereof. The anode active material may be, for example, at least one selected from lithium metal, a metal alloyable with lithium, a transition metal oxide, a non-transition metal oxide, or a carbonaceous material. When lithium metal is used as the anode active material, the anode current collector may or may not be omitted. When the current collector is omitted, the volume and weight occupied by the current collector may reduce, and thus, the energy density per unit weight of the lithium battery may improve.

The anode active material may be, for example, an alloy of lithium metal with a different anode active material. The metal alloyable with lithium may be, for example, Si, $S_n$, Al, Ge, Pb, Bi, Sb, a Si—Y alloy (wherein Y may be an alkali metal, an alkaline earth metal, a Group 13 element, a Group 14 element, a transition metal, a rare earth element, or a combination of these elements, and is not Si), a $S_n$—Y alloy (wherein Y may be an alkali metal, an alkaline earth metal, a Group 13 element, a Group 14 element, a transition metal, a rare earth element, or a combination of these elements, and is not $S_n$), or the like. The element Y may be, for example, Mg, Ca, Sr, Ba, Ra, Sc, Y, TI, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, $S_n$, In, Ti, Ge, P, As, Sb, Bi, S, Se, Te, Po, or a combination thereof. The lithium alloy may be, for example, a lithium-aluminum alloy, a lithium-silicon alloy, a lithium-tin alloy, a lithium-silver alloy, a lithium-lead alloy, or the like.

The anode active material may be a transition metal oxide, such as lithium titanium oxide, vanadium oxide, lithium vanadium oxide, or the like. The anode active material may be, for example, $SnO_2$, $SiO_x$ (wherein 0<x<2), or the like. The anode active material may be, for example, a carbonaceous material. The carbonaceous material may be, for example, crystalline carbon, amorphous carbon, or a mixture thereof. The crystalline carbon may be graphite, for example, natural or artificial graphite, which may be shapeless or in the form of a plate, a flake, a sphere, or a fiber. The amorphous carbon may be, for example, soft carbon or hard carbon, mesophase pitch carbide, sintered cokes, or the like.

The anode active material layer may include, for example, a silicon-based active material as the anode active material. The silicon-based anode active material may include silicon, a silicon-carbon composite, $SiO_x$ (wherein 0<x<2), an Si-Q alloy (wherein Q is an element selected from an alkali metal, an alkaline earth metal, a Group 13 element, a Group 14 element, a Group 15 element, a Group 16 element, a transition metal, a rare earth element, or combinations thereof, but is not Si), or a combination thereof, and may be a mixture of at least one of these materials and $SiO_2$. The element Q may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, $S_n$, In, TI, Ge, P, As, Sb, Bi, S, Se, Te, Po, or combinations thereof.

The anode active material layer may include: a silicon-carbon composite including silicon particles and a first carbonaceous material; a silicon-carbon composite including a core in which silicon particles and a second carbonaceous material are mixed, and a third carbonaceous material surrounding the core; or a combination thereof.

The first carbonaceous material, the second carbonaceous material, or the third carbonaceous material may each independently be crystalline carbon, amorphous carbon, or a combination thereof. The silicon-carbon composite may include a core including silicon particles and a crystalline carbon, and an amorphous-carbon coating layer located on the surface of the core.

When the silicon-carbon composite as described above is used as the silicon-based active material, the secondary battery may exhibit high capacity and implement stable cycle characteristics.

In the silicon-carbon composite including silicon particles and the first carbonaceous material, an amount of the silicon particles may be about 30 wt % to about 70 wt %, for example, about 40 wt % to about 50 wt %, based on a total weight of the silicon-carbon composite. In other embodiments, the silicon-based active material may include a silicon-carbon composite including a core in which silicon particles and the second carbonaceous material are mixed, and the third carbonaceous material surrounding the core. When the silicon-carbon composite is used, the secondary battery may have very high capacity, an improved capacity retention rate, and particularly, improved high-temperature lifespan characteristics.

In addition, with respect to 100 parts by weight of the silicon-carbon composite, an amount of the third carbonaceous material included may be about 1 wt % to about 50 wt %, or about 5 wt % to about 40 wt %, or about 10 wt % to about 30 wt %, and an amount of the silicon particles included may be about 30 wt % to about 70 wt %, about 35 wt % to about 60 wt %, or about 40 wt % to about 55 wt %. An amount of the second carbonaceous material included may be about 20 wt % to about 69 wt %, about 25 wt % to about 60 wt %, or about 30 wt % to about 50 wt %. When the amounts of the silicon particles, the third carbonaceous material, and the second carbonaceous material are within the above ranges, the secondary battery may have excellent discharge capacity and improved capacity retention rate.

The silicon particles may have an average particle diameter of about 10 nm to about 30 µm, for example, about 10 nm to about 1000 nm, or about 20 nm to about 150 nm. When the average particle diameter of the silicon particles are within the above ranges, volume expansion which occurs during charging and discharging may be suppressed, and interruption of electron migration due to particle breaking during charging and discharging may be prevented.

In the silicon-carbon composite, for example, the second carbonaceous material may be crystalline carbon, and the third carbonaceous material may be amorphous carbon. That is, the silicon-carbon composite may be a silicon-carbon composite including a core, which includes silicon particles and crystalline carbon, and an amorphous carbon coating layer located on the surface of the core.

The crystalline carbon may include artificial graphite, natural graphite, or a combination thereof. The amorphous carbon may include pitch carbon, soft carbon, hard carbon, mesophase pitch carbide, calcined cokes, carbon fiber, or a combination thereof. A precursor of the amorphous carbon may be a polymer resin such as a coal-based pitch, a mesophase pitch, a petroleum-based pitch, a coal-based oil, a petroleum-based heavy oil or a phenol resin, a furan resin, a polyimide resin, or a combination thereof.

The silicon-carbon composite may include about 10 wt % to about 60 wt % or about 20 wt % to about 50 wt % of silicon and about 40 wt % to about 90 wt % or about 50 wt % to about 80 wt % of a carbonaceous material, with respect to 100 parts by weight of the silicon-carbon composite. In addition, in the silicon-carbon composite, an amount of the crystalline carbon may be about 10 wt % to about 70 wt % or about 20 wt % to about 60 wt %, and an amount of the amorphous carbon may be about 20 wt % to about 40 wt % or about 25 wt % to about 35 wt %, with respect to a total weight of the silicon-carbon composite. As used herein, the average particle diameter (D50) means the diameter of particles at 50% by volume in a cumulative particle size distribution by volume.

The amounts of the anode active material, the conductive material, the binder, and the solvent may be those commonly used in lithium secondary batteries. At least one of the conductive material, the binder, and the solvent may be omitted according to the use and structure of the lithium battery.

The amount of the binder included in the anode may be, for example, 0.1 wt % or more, 10 wt % or less, or from about 0.1 wt % to about 5 wt %, with respect to a total weight of the anode active material layer. The amount of the conductive material included in the anode may be, for example, from about 0.1 wt % to about 10 wt %, or from about 0.1 wt % to about 5 wt %, with respect to the total weight of the anode active material layer. The amount of the anode active material included in the anode may be, for example, from about 90 wt % to about 99 wt %, or from about 95 wt % to about 99 wt %, with respect to the total weight of the anode active material layer. When the anode active material is lithium metal, the anode may not include a binder or a conductive material, or a combination thereof.

Next, the separator 30 according to one or more embodiments, which is to be inserted between the cathode 10 and the anode 20, may be prepared.

Next, a liquid electrolyte may be prepared. The liquid electrolyte may be, for example, an anhydrous electrolyte. The liquid electrolyte may be, for example, an organic electrolyte. The organic electrolyte may be prepared, for example, by dissolving a lithium salt in an organic solvent.

The organic solvent may be any suitable organic solvent used in the art. The organic solvent may be, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

The lithium salt may be any suitable lithium salt used in the art. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently an integer from 1 to 20), LiCl, LiI, or a mixture thereof. A concentration of the lithium salt included in the liquid electrolyte may be, for example, from about 0.1 mole per liter (M) to about 10 M, or from about 0.1 M to about 5 M.

The secondary battery may include a cathode, an anode, and a separator structure. The cathode, the anode, and the separator structure may be stacked, wound, or folded, and accommodated in a battery case (not shown). A liquid electrolyte may be injected into the battery case and sealed, thereby completing the manufacture of secondary battery 1. The battery case may have, for example, a prismatic, thin-film, or cylindrical shape, but is not necessarily limited thereto.

A cathode active material of the cathode active material layer may include, for example, at least a compound selected from compounds represented by Formula 1 to Formula 4:

$$Li_aCo_xM_yO_{2-\alpha}X_\alpha \qquad \text{Formula 1}$$

wherein in Formula 1, $1.0 \leq a \leq 1.2$, $0.9 \leq x<1$, $0 \leq y \leq 0.1$, $0 \leq \alpha \leq 0.2$, and $x+y=1$, M may be titanium (Ti), magnesium (Mg), aluminum (Al), gallium (Ga), silicon (Si), tin ($S_n$), nickel (Ni), yttrium (Y), vanadium (V), zirconium (Zr), Hafnium (Hf), iron (Fe), chromium (Cr), copper (Cu), zinc (Zn), molybdenum (Mo), tungsten (W), niobium (Nb), manganese (Mn), tellurium (Te), barium (Ba), antimony (Sb), tantalum (Ta), germanium (Ge), boron (B), or a combination thereof, and X may be F, S, Cl, Br, or a combination thereof;

$$Li_aNi_xCo_yMn_zAl_wM_vO_{2-\alpha}X_\alpha \qquad \text{Formula 2}$$

wherein in Formula 2, $1.0 \leq a \leq 1.2$, $0<x<1.0$, $0 \leq y<1.0$, $0 \leq z<1.0$, $0 \leq w<1.0$, $0 \leq v \leq 0.1$, $0 \leq \alpha \leq 0.2$, $x+y+z+w+V=1$, M may be titanium (Ti), magnesium (Mg), gallium (Ga), silicon (Si), tin ($S_n$), yttrium (Y), vanadium (V), zirconium (Zr), hafnium (Hf), iron (Fe), chromium (Cr), copper (Cu), zinc (Zn), molybdenum (Mo), tungsten (W), niobium (Nb), tellurium (Te), barium (Ba), antimony (Sb), tantalum (Ta), germanium (Ge), boron (B), or a combination thereof, and X may be F, S, Cl, Br, or a combination thereof;

$$Li_aMn_{2-x}M_xO_{4-\alpha}X_\alpha \qquad \text{Formula 3}$$

wherein in Formula 3, $0.90 \leq a \leq 1.1$, $0 \leq x \leq 0.1$, $0 \leq \alpha<0.2$, M may be titanium (Ti), magnesium (Mg), aluminum (Al), gallium (Ga), silicon (Si), tin (Sn), nickel (Ni), yttrium (Y), vanadium (V), zirconium (Zr), Hafnium (Hf), iron (Fe), chromium (Cr), copper (Cu), zinc (Zn), molybdenum (Mo), cobalt (Co), tungsten (W), niobium (Nb), tellurium (Te), Barium (Ba), antimony (Sb), tantalum (Ta), germanium (Ge), boron (B), or a combination thereof, and X may be F, S, Cl, Br, or a combination thereof;

$$Li_aFe_bMn_cCo_dNi_eM_xPO_{4-\alpha}X_\alpha \qquad \text{Formula 4}$$

wherein in Formula 4, $0.9 \leq a \leq 1.1$, $0 \leq b<1$, $0 \leq c<1$, $0 \leq d<1$, $0 \leq e<1$, $0 \leq x \leq 0.1$, $b+c+d+e+x=1$, $0 \leq \alpha \leq 0.2$, M may be titanium (Ti), magnesium (Mg), aluminum (Al), gallium (Ga), silicon (Si), tin ($S_n$), yttrium (Y), vanadium (V), zirconium (Zr), hafnium (Hf), chromium (Cr), copper (Cu), zinc (Zn), Molybdenum (Mo), tungsten (W), niobium (Nb), tellurium (Te), barium (Ba), antimony (Sb), tantalum (Ta), germanium (Ge), boron (B), or a combination thereof, and X may be F, S, Cl, Br, or a combination thereof.

The cathode active material may include at least a compound selected from compounds represented by Formulae 5 to 8:

$$Li_aCoO_{2-\alpha}X_\alpha \qquad \text{Formula 5}$$

wherein in Formula 5, $1.0 \leq a \leq 1.2$, $0 \leq a \leq 0.2$, and X may be F, S, Cl, Br, or a combination thereof;

$$Li_aNi_xCo_yMn_zAl_wO_{2-\alpha}X_\alpha \qquad \text{Formula 6}$$

wherein in Formula 6, $1.0 \leq a \leq 1.2$, $0<x<1.0$, $0 \leq y<1.0$, $0 \leq z<1.0$, $0 \leq w<1.0$, $0 \leq \alpha \leq 0.2$, $x+y+z+W=1$, and X may be F, S, Cl, Br, or a combination thereof;

$$Li_aMn_2O_{4-\alpha}X_\alpha \qquad \text{Formula 7}$$

wherein in Formula 7, $0.90 \leq a \leq 1.1$, $0 \leq a \leq 0.2$, and X may be F, S, Cl, Br, or a combination thereof;

$$Li_aFe_bMn_cCo_dNi_ePO_{4-\alpha}X_\alpha \qquad \text{Formula 8}$$

wherein in Formula 8, $0.9 \leq a \leq 1.1$, $0 \leq b<1$, $0 \leq c<1$, $0 \leq d<1$, $0 \leq e<1$, $b+c+d+e=1$, $0 \leq \alpha \leq 0.2$, and X may be F, S, Cl, Br, or a combination thereof.

The cathode active material may include, for example, $LiCoO_2$ (LCO), $Li[Ni_xCo_yMn_z]O_2$ (NCM) wherein $0<x<1$, $0<y<1$, $0<Z<1$, $Li[Ni_xCo_yAl_z]O_2$ (NCA) wherein $0<x<1$, $0<y<1$, $0<Z<1$, $LiMn_2O_4$ (LMO), or $LiFePO_4$ (LFP).

One or more embodiments of the disclosure will now be described in detail with reference to the following examples. However, these examples are only for illustrative purposes and are not intended to limit the scope of the one or more embodiments of the disclosure.

EXAMPLES

Formation of first high-density layer, second high-density layer, and low-density layer Manufacture Example 1: Manufacture of First High-Density Layer and Second High-Density Layer A slurry, including in a predetermined ratio $LiCoO_2$ (LCO) powder having an average particle diameter (D50) of 0.3 μm as a cathode active material, polyvinyl butyral as a binder, dibutyl phthalate as a plasticizer, an ester-based surfactant as a dispersant, and a mixed solvent of toluene and ethanol under azeotropic conditions as a solvent, was coated on a transfer belt using tape casting to prepare a sheet form. In the slurry, an amount of the cathode active material ($LiCoO_2$) was about 50 wt %, and a total amount of the dispersant, the plasticizer, and the binder was about 5 wt %, and the amount of the solvent was about 45 wt %.

The sheet was dried at 200° C. to prepare a LCO green sheet for a first high-density layer and a second high-density layer.

Manufacture Example 2: Manufacture of Low-Density Layer

A LCO green sheet for the low-density layer was prepared in the same manner as in Manufacture Example 1, except that LiCoO$_2$ powder having an average particle diameter (D50) of about of 1 μm, instead of LiCoO$_2$ powder having a D50 of 0.3 μm, was used as the cathode active material.

Manufacture of Cathode and Lithium Secondary Battery

Example 1

A cathode active material sheet stack was prepared, in which the cathode active material sheet stack included three high-density layers, i.e., a 1-1st high-density layer (h1-1), a 1-2nd high-density layer (h1-2), and a 1-3rd high-density layer (h1-3), and one second high-density layer (h2-1), and low-density layers (L) were disposed between the first high-density layers (i.e., between (h-1) and (h1-2), and between (h1-2) and (h1-3)), and between the 1-3rd high-density layer and the second high-density layer (i.e., between (h1-3) and (h2-1)).

After sintering, the thickness of each of the 1-1st high-density layer (h1-1), the 1-2nd high-density layer (h1-2), and the 1-3rd high-density layer (h1-3) was 12 μm, and the thickness of the second high-density layer (h2-1) was 24 μm. The thickness of the low-density layer was 2.5 μm. Here, the thickness of each layer refers to the thickness after sintering. In consideration of reduction in thickness after sintering, the thickness of each of the first high-density layer, the second high-density layer, and the low-density layers was formed to be about 20% larger than a desired thickness.

A plurality of through-holes which extend from a first surface of the cathode active material sheet stack to an opposite second surface were formed by laser thrilling.

A current collector to which a binder was applied was disposed on the second surface of the cathode active material sheet stack having the through-holes formed therein.

After the cathode active material sheet stack having the through-holes formed therein was aligned on the current collector, sintering was performed at 1,025° C. for 2 hours in the air atmosphere to prepare a three-dimensional cathode structure (current collector/h1-1/L/h1-2/L/h1-3/l/h2-1, where h1-1/h1-2/h1-3/h2-1 layers have a thickness ratio of 1:1:1:2) having a channel structure (see FIG. 2). In the cathode structure, the first high-density layer, the low-density layer, and the second high-density layer were stacked in a direction away from the current collector.

The channels of the three-dimensional cathode active material layer structure had a diameter of 30 μm and a pitch of 100 μm. One channel consisted of a plurality of through-holes arranged in a first direction (Z direction).

Separately, 98 wt % of a silicon-carbon composite and artificial graphite (in a 1:1 mixed weight ratio of the silicon-carbon composite and the artificial graphite), 1.0 wt % of styrene-butadiene rubber (SBR) binder (ZEON), and 1.0 wt % of carboxymethylcellulose (CMC, NIPPON A&L) were mixed, and then distilled water was added thereto and agitated with a mechanical agitator for 60 minutes to prepare an anode active material slurry. The anode active material slurry was coated on a copper current collector of a 10 μm thickness to a thickness of about 60 μm and dried in a 100° C. hot-air drier for 0.5 hour, and dried again in a vacuum at 120° C. for 4 hours, and then roll-pressed to manufacture an anode.

A polyethylene separator (having a thickness of 14 μm) was stacked on the anode, and the cathode structure described above was stacked on the surface of the separator to manufacture a lithium secondary battery. The lithium secondary battery was provided with an electrolyte. A solution of 1.15 M LiPF$_6$ dissolved in ethylene carbonate (EC), ethyl methyl carbonate (EMC), and dimethyl carbonate (DMC)(in a volume ratio of 3:4:3) was used as the electrolyte.

Example 2

A cathode structure and a lithium secondary battery were manufactured in the same manner as in Example 1, except that the cathode active material sheet stack was manufactured according to the following procedure.

To manufacture the cathode active material sheet stack, a 1-1st high-density layer (h1-1), a 1-2nd high-density layer (h1-2), a 2-1st high-density layer (h2-1), and a 2-2nd high-density layer (h2-2) were sequentially stacked, and low-density layers were respectively stacked between the 1-1st high-density layer (h1-1) and the 1-2nd high-density layer (h1-2), between the 1-2nd high-density layer (h1-2) and the 2-1st high-density layer (h2-1), and between the 2-1st high-density layer (h2-1) and the 2-2nd high-density layer (h2-2).

A cathode (see FIG. 5, h1-1/L/h1-2/L/h2-1/L/h2-2)(in a 1:1:2:3 thickness ratio of h1-1, h1-2, h2-1, and h2-2) was manufactured in the same manner as in Example 1, except that the 1-1st high-density layer (h1-1) and the 1-2nd high-density layer (h1-2) both had a thickness of 8.5 μm, and the 2-1st high-density layer (h2-1) and the 2-2nd high-density layer (h2-2) had different thicknesses of 17 μm and 25 μm, respectively. Here, the thickness of each layer refers to the thickness after sintering. In consideration of reduction in thickness after sintering, the thickness of each of the first high-density layer, the second high-density layer, and the low-density layers was formed to be about 20% larger than a desired thickness.

Example 3

A cathode structure (see FIG. 4, h1-1/L/h1-2/L/h2-1/L/h2-2)(in a 1:1:2:2 thickness ratio of h1-1, h1-2, h2-1, and h2-2) and a lithium secondary battery were manufactured in the same manner as in Example 2, except that the 1-1st high-density layer (h1-1) and the 1-2nd high-density layer (h1-2) both had a thickness of 10 μm, and the 2-1st high-density layer (h2-1) and the 2-2nd high-density layer (h2-2) both had a thickness of 20 μm. Here, the thickness of each layer refers to the thickness after sintering.

Example 4

A cathode structure (see FIG. 3, h1-1/L/h1-2/L/h1-3/L/h2-1)(in a 1:1:1:3 thickness ratio of h1-1, h1-2, h1-3, and h2-1) and a lithium secondary battery were manufactured in the same manner as in Example 1, except that all of the 1-1st high-density layer (h1-1), the 1-2nd high-density layer (h1-2), and the 1-3rd high-density layer (h1-3) of the first high-density layer had a thickness of 10 μm, and the second high-density layer (h2-1) had a thickness of 30 μm. Here, the thickness of each layer refers to the thickness after sintering.

Example 5

A cathode structure (h1-1/L/h1-2/L/h1-3/L/h2-1)(in a 1:1:1:4.5 thickness ratio of h1-1, h1-2, h1-3, and h2-1) and a lithium secondary battery were manufactured in the same manner as in Example 1, except that all of the 1-1st high-density layer (h1-1), the 1-2nd high-density layer (h1-2), and the 1-3rd high-density layer (h1-3) of the first high-density layer had a thickness of 8.5 μm after the sintering, and the second high-density layer (h2-1) had a thickness of 36 μm. Here, the thickness of each layer refers to the thickness after sintering.

Comparative Example 1

A cathode structure and a lithium secondary battery were manufactured in the same manner as in Example 1, except that the cathode active material sheet stack was manufactured according to the following procedure.

To manufacture the cathode active material sheet stack, a 1-1st high-density layer (h1-1), a 1-2nd high-density layer (h1-2), a 2-1st high-density layer (h2-1), and a 2-2nd high-density layer (h2-2) were sequentially stacked, and low-density layers were respectively stacked between the 1-1st high-density layer (h1-1) and the 1-2nd high-density layer (h1-2), between the 1-2nd high-density layer (h1-2) and the 2-1st high-density layer (h2-1), and between the 2-1st high-density layer (h2-1) and the 2-2nd high-density layer (h2-2).

A cathode structure and a lithium secondary battery were manufactured in the same manner as in Example 1, except that, in manufacturing the cathode structure, the 1-1st high-density layer (h1-1) and the 1-2nd high-density layer (h1-2) both had a thickness of 15 μm, and the 2-1st high-density layer (h2-1) and the 2-2nd high-density layer (h2-2) both had a thickness of 15 μm. Here, the thickness of each layer refers to the thickness after sintering.

Comparative Example 2

A cathode structure and a lithium secondary battery were manufactured in the same manner as in Example 1, except that the cathode active material sheet stack was manufactured according to the following procedure.

A cathode active material sheet stack was manufactured, low-density layers each having a thickness of 2.5 μm were arranged respectively between the 1-1st high-density layer (h1-1) and the 1-2nd high-density layer (h1-2), and between the 1-2nd high-density layer (h1-2) and the 1-3rd high-density layer (h1-3). The 1-1st high-density layer (h1-1), the 1-2nd high-density layer (h1-2), and the 1-3rd high-density layer (h1-3) each had a thickness of 20 μm. Here, the thickness of each layer refers to the thickness after sintering.

Comparative Example 3

A cathode structure and a lithium secondary battery were manufactured in the same manner as in Example 1, except that the cathode active material sheet stack was manufactured according to the following procedure.

A cathode active material sheet stack was manufactured, in which three first high-density layers (h1-1, h1-2, and h1-3) and low-density layers were included, the low-density layers each has a thickness of 2.5 μm after the sintering, and are disposed between the 1-1st first high-density layer (h1-1) and the 1-2nd first high-density layer (h1-2), and between the 1-2nd first high-density layer (h1-2) and the 1-3rd first high-density layer (h1-3).

The first high-density layers (h1-1, h1-2, and h1-3) had thicknesses of 24 μm, 12 μm and 12 μm, respectively, after the sintering, and the 1-1st high-density layer (h1-1) had the largest thickness and was in direct contact with the current collector.

Evaluation Example 1: COMSOL

A state-of-charge (SOC) of each of the cathode structures manufactured according to Example 1 and Comparative Examples 1 to 3, shown in FIGS. 11A, 12A, 13A, and 14A, was analyzed using a COMSOL analysis program (COMSOL Multiphysics® software), and the SOCs thereof obtained from simulation are shown in FIGS. 11B, 12B, 13B, and 14B. The evaluation results of FIGS. 11B, 12B, 13B, and 14B are from the evaluation of SOC values, that is, the discharge capacities of any part of the electrode after full discharging, expressed as percentages. In relation to current density, a uniform SOC indirectly implies that there is a uniform introduction of lithium ions, and that the current density is proportional to the amount of lithium ion migration, and thus, the SOC has a high value of uniform color.

The SOC values of the electrode structures of Examples 1 and Comparative Examples 1 to 3, shown in FIGS. 11B, 12B, 13B, and 14B, are from the evaluation of the SOC in the dashed region of each of FIGS. 11A, 12A, 13A, and 14A.

Figure 11A:
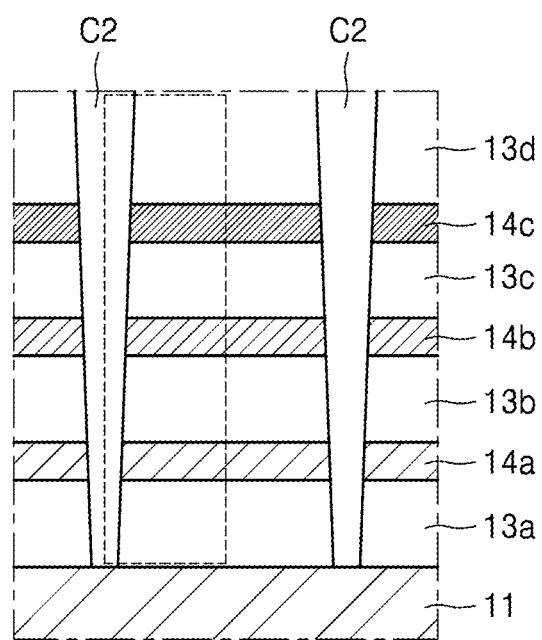
FIG. 11A is a schematic view showing a structure of a cathode manufactured according to Example 1.
Figure 11B:
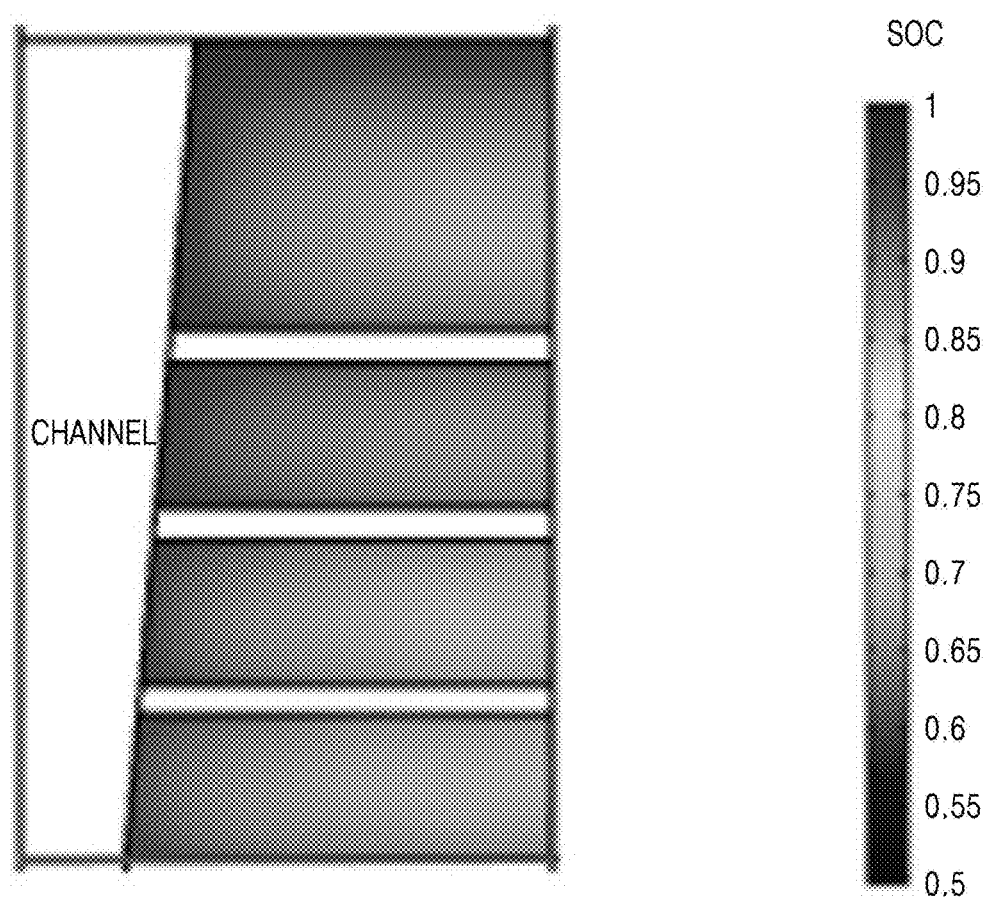
FIG. 11B shows results of simulation with a COMSOL analysis program, for the cathode manufactured according to Example 1.

Referring to these figures, it was found that, despite increased electrode thickness in the 3D structure, the cathode structure of Example 1 had a very uniform current density with an SOC of 1 over the entire area of the cathode structure, as can be seen from FIG. 11B.

Figure 12A:
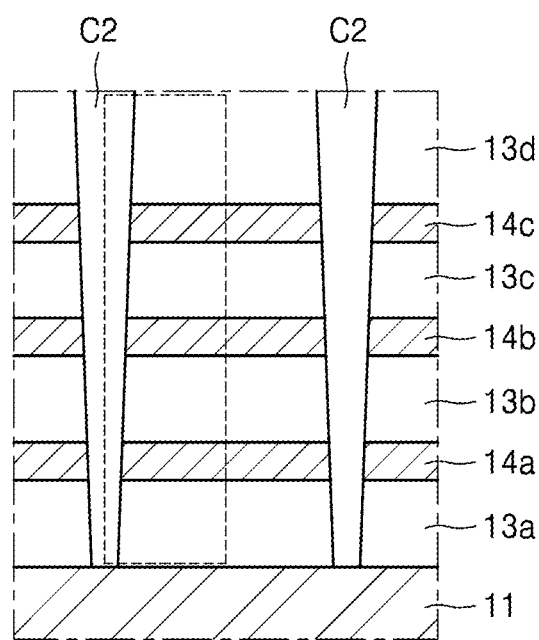
FIG. 12A is a schematic view showing a structure of a cathode manufactured according to Comparative Example 1.
Figure 12B:
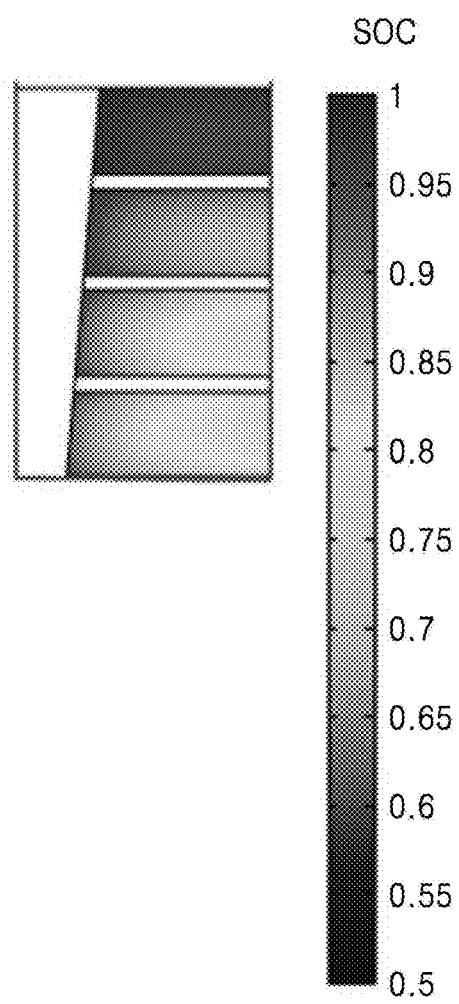
FIG. 12B shows results of simulation with a COMSOL analysis program, for the cathode manufactured according to Comparative Example 1.
Figure 13A:
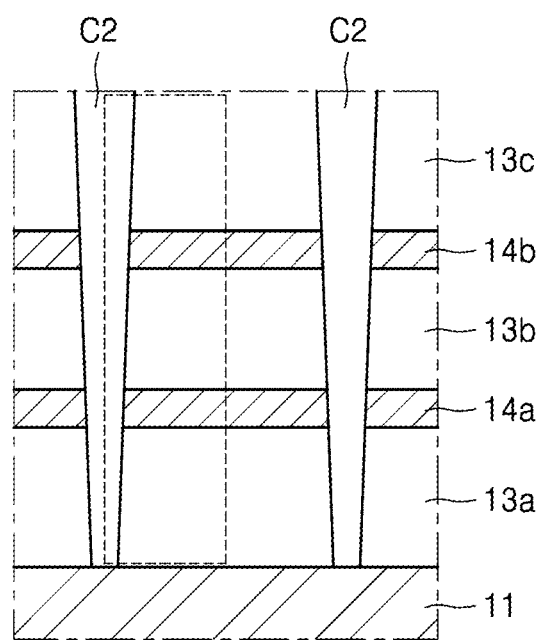
FIG. 13A is a schematic view showing a structure of cathode manufactured according to Comparative Example 2.
Figure 13B:
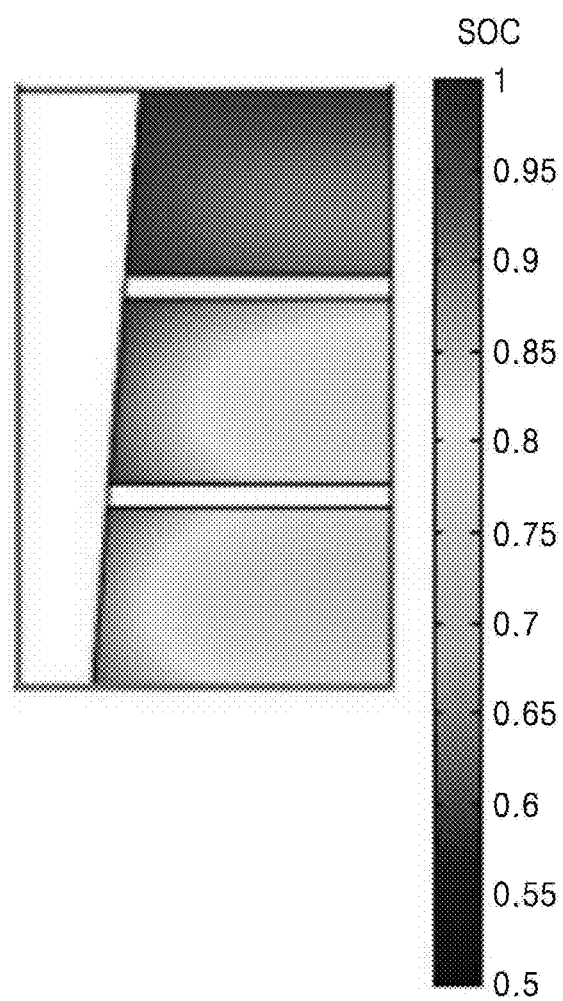
FIG. 13B shows results of simulation with a COMSOL analysis program, for the cathode manufactured according to Comparative Example 2.
Figure 14A:
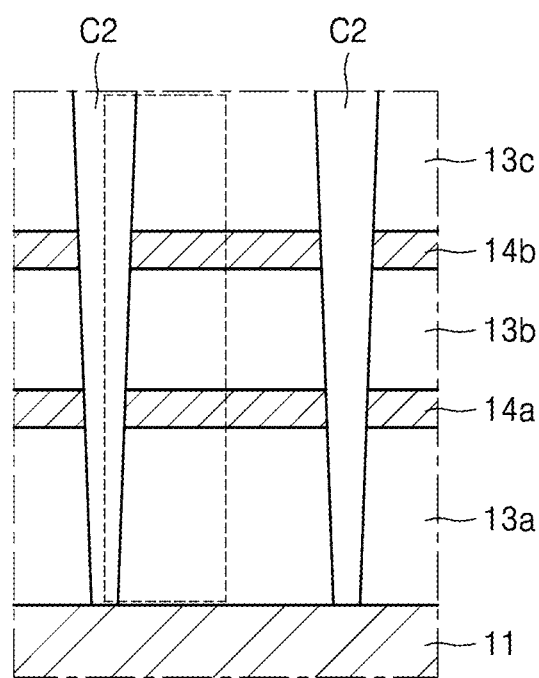
FIG. 14A is a schematic view showing a structure of a cathode manufactured according to Comparative Example 3.
Figure 14B:
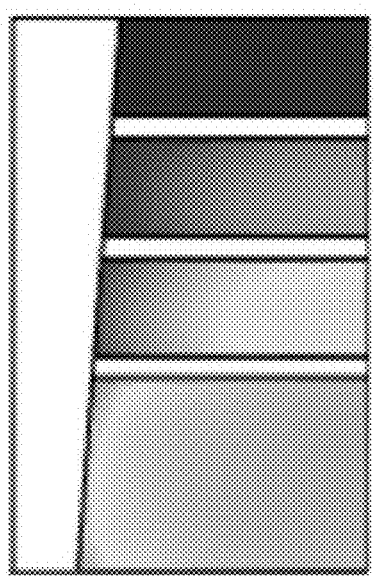
FIG. 14B shows results of simulation with a COMSOL analysis program, for the cathode manufactured according to Comparative Example 3.

In comparison, it was found that the cathode structure of Comparative Example 1 had a SOC of 1 in a region of the active material layer away from the current collector and a SOC of 0.85 or less in a region of the active material layer close to the current collector, as shown in FIG. 12B. As shown in FIGS. 13B and 14B, in the electrode structures of Comparative Example 2 and Comparative Example 3, current densities were found to be non-uniform.

Evaluation Example 2: Rate Capability (I)

Rate capabilities of the lithium secondary batteries of Example 1, Comparative Example 1, and Comparative Example 2 were evaluated according to the following methods.

The lithium secondary batteries were each charged at a constant current of 0.1C rate at 25° C. until a voltage of 4.35 V (vs. Li) was reached, and then a constant voltage mode of 4.35 V was maintained and cut off at a current of 0.01C rate. Subsequently, each lithium secondary battery was discharged at a constant current of 0.1C rate until a voltage of 3 V (vs. Li) was reached (formation process 1, $1^{st}$ cycle).

Each lithium secondary battery after the formation process ($1^{st}$ cycle) was charged at a constant current of 0.2C rate at 25° C. until a voltage of 4.35 V (vs. Li) was reached, and then a constant voltage mode of 4.35 V was maintained and cut off at a current of 0.01C rate. Subsequently, each lithium secondary battery was discharged at a constant current of 0.2C rate until a voltage of 3 V (vs. Li) was reached ($2^{nd}$ cycle).

Each lithium secondary battery after the $2^{nd}$ cycle was charged at a constant current of 0.8C rate at 25° C. until a voltage of 4.35 V (vs. Li) was reached, and then a constant voltage mode of 4.35 V was maintained and cut off at a current of 0.02C rate. Subsequently, each lithium secondary battery was discharged at a constant current of 0.5C rate until a voltage of 3 V (vs. Li) was reached ($3^{rd}$ cycle).

Each lithium secondary battery after the $3^{rd}$ cycle was charged at a constant current of 0.8C rate at 25° C. until a voltage of 4.35 V (vs. Li) was reached, and then a constant voltage mode of 4.35 V was maintained and cut off at a current of 0.1C rate. Subsequently, each lithium secondary battery was discharged at a constant current of 1C rate until a voltage of 3V (vs. Li) was reached (4$^{th}$ cycle).

The 4$^{th}$ charge/discharge cycle was repeated to perform a total of 351 charging/discharging.

Rate capability is defined by Equation 1. The evaluation results are shown in Table 1.

Rate capability (%)=[Discharge capacity at 1C/Discharge capacity at 0.2C]×100%  Equation 1

Evaluation Example 3: Lifespan

The lithium secondary batteries of Example 1 and Comparative Example 1 were each charged at a constant current of 0.1C rate at 25° C. until a voltage of 4.35 V (vs. Li) was reached, and then a constant voltage mode of 4.35 V was maintained and cut off at a current of 0.01C rate. Subsequently, each lithium secondary battery was discharged at a constant current of 0.1C rate until a voltage of 3 V (vs. Li) was reached (formation process, 1$^{st}$ cycle).

Each lithium secondary battery after the formation process (1$^{st}$ cycle) was charged at a constant current of 0.2C rate at 25° C. until a voltage of 4.35 V (vs. Li) was reached, and then a constant voltage mode of 4.35 V was maintained and cut off at a current of 0.01C rate. Subsequently, each lithium secondary battery was discharged at a constant current of 0.2C rate until a voltage of 3V (vs. Li) was reached (2$^{nd}$ cycle).

Each lithium secondary battery after the 2$^{nd}$ cycle was charged at a constant current of 0.8C rate at 25° C. until a voltage of 4.35 V (vs. Li) was reached, and then a constant voltage mode of 4.35 V was maintained and cut off at a current of 0.02C rate. Subsequently, each lithium secondary battery was discharged at a constant current of 0.5 C rate until a voltage of 3V (vs. Li) was reached (3$^{rd}$ cycle).

Each lithium secondary battery after the 3$^{rd}$ cycle was charged at a constant current of 0.8C rate at 25° C. until a voltage of 4.35 V (vs. Li) was reached, and then a constant voltage mode of 4.35 V was maintained and cut off at a current of 0.1C rate. Subsequently, each lithium secondary battery was discharged at a constant current of 1C rate until a voltage of 3V (vs. Li) was reached (4$^{th}$ cycle).

The fourth charging/discharging process was repeated to perform a total of 400 charging/discharging.

Lifespan is defined by Equation 2. The evaluation results are shown in Table 1.

Lifespan=[Discharge capacity at 400$^{th}$ cycle/Discharge capacity at 2$^{nd}$ cycle]×100%  Equation 2

In Table 1, energy densities are also shown.

TABLE 1

| Example | Energy density (Wh/L) @ 0.2 C | Rate capability (%) | Lifespan (%) |
| --- | --- | --- | --- |
| Example 1 | 604 | 94.7 | 88.6 |
| Comparative Example 1 | 600 | 88 | <85 |
| Comparative Example 2 | 604 | 90.4 | 87.9 |

As shown in Table 1, it was found that the lithium secondary battery of Example 1 had excellent energy density and improvements in rate capability and lifespan characteristics, compared to those of the lithium secondary batteries of Comparative Examples 1 and 2.

Evaluation Example 4: Rate Capability Analysis (II)

Rate capabilities of the lithium secondary batteries of Examples 1-5 and Comparative Example 1 were analyzed in the same manner as in the rate capability evaluation method as in Evaluation example 2. The results are shown in Table 2.

TABLE 2

| Example | Thickness ratio of h1-1/h1-2/h1-3/h2-1 or thickness ratio of h1-1/h1-2/h2-1/h2-2 | Rate capability (%) (Discharge capacity at 1.0 C/0.2 C) |
| --- | --- | --- |
| Example 2 | 8.5:8.5:17:25 (1:1:2:3) | 92 |
| Example 3 | 10:10:20:20 (1:1:2:2) | 92 |
| Example 1 | 12:12:12:24 (1:1:1:2) | 94 |
| Example 4 | 10:10:10:30 (1:1:1:3) | 94 |
| Example 5 | 8:8:8:36 (1:1:1:4.5) | 94 |
| Comparative Example 1 | 15:15:15:15 (1:1:1:1) | 88 |

Referring to Table 2, it was found that the lithium secondary batteries of Examples 1 to 5 had improvements in rate capability, compared to those of Comparative Example 1.

Evaluation Example 5: Scanning Electron Microscope

The cathode structure manufactured according to Example 1 was analyzed using a scanning electron microscope. The results are shown in FIGS. 15A to 15C.

Figure 15A:
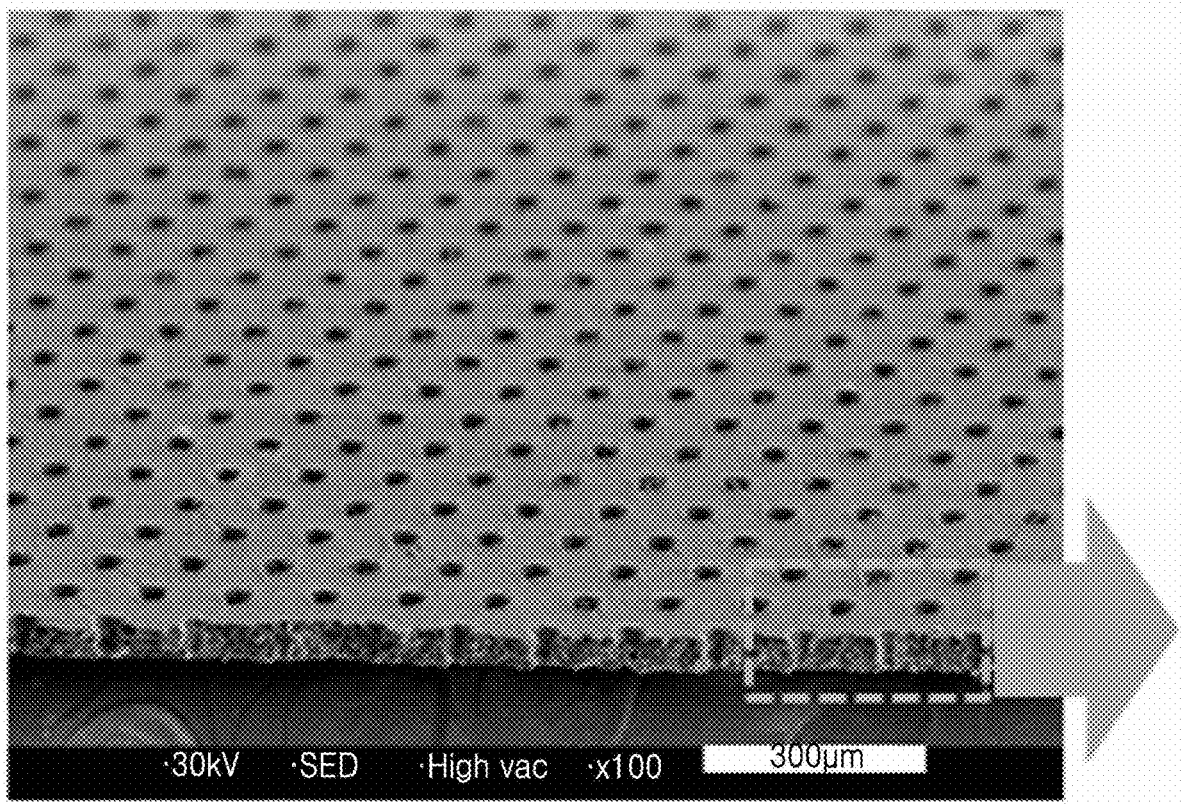
FIG. 15A shows results of scanning electron microscopy analysis of an active material structure manufactured according to Example 1.
Figure 15B:
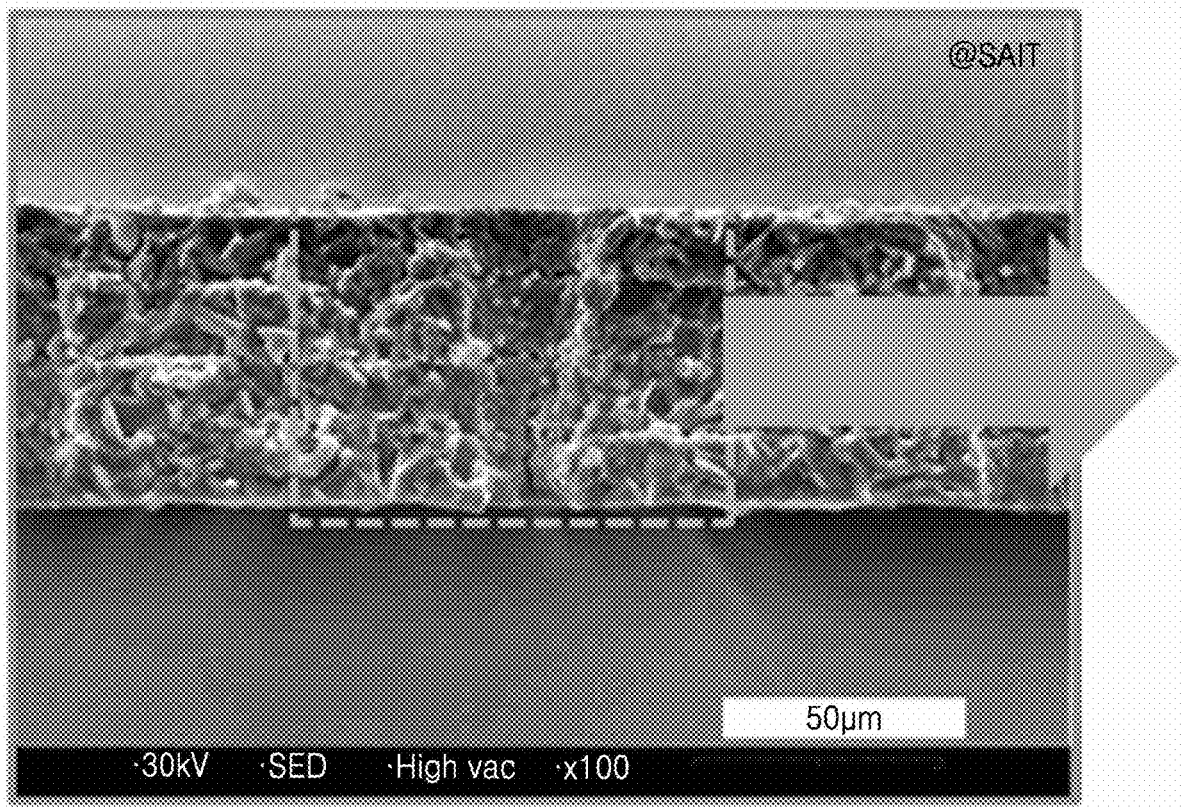
FIG. 15B is an enlarged view of a region indicated by an arrow in FIG. 15A.

FIG. 15B is an enlarged view of a region indicated by an arrow in FIG. 15A. FIG. 15C is an enlarged view of a rectangular region of FIG. 15B.

Figure 15C:
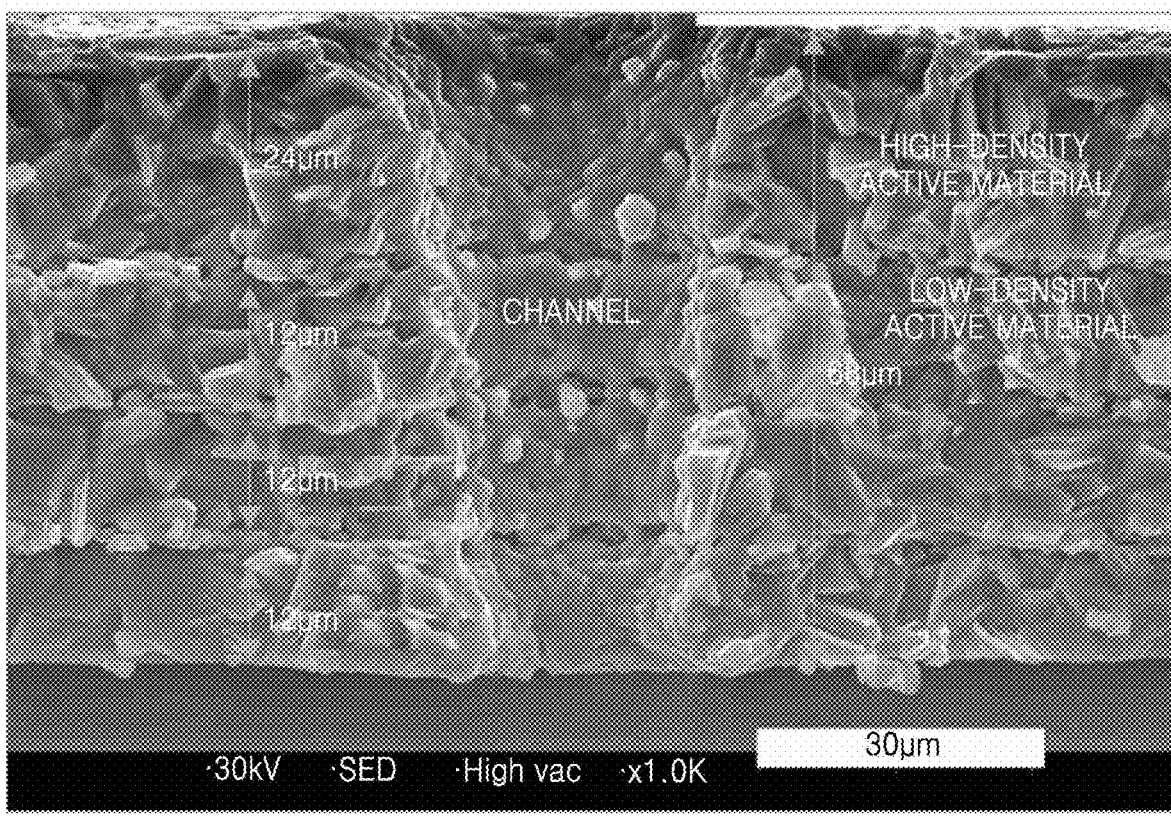
FIG. 15C is an enlarged view of a rectangular region of FIG. 15B.

Referring to FIG. 15C, it was found that the cathode structure of Example 1 had a stacked structure of layers of high-density active material and low-density active material, and a channel formed in the active material structure.

As described above, according to one or more embodiments, the electrode may improve the migration of lithium ions with uniform current density. Using the electrode structure, a secondary battery with high energy density and improved rate capability and lifespan characteristics may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electrode for a secondary battery, the electrode comprising:
   a current collector; and
   an active material structure on the current collector, the active material structure comprising
   at least one first high-density layer, and
   at least one second high-density layer, the at least one second high-density layer being further away from the current collector as compared to the at least one first high-density layer; and
   a low-density layer between the at least one first high-density layer and the at least one second high-density layer,
   wherein a thickness of the at least one second high-density layer is greater than a thickness of the at least one first high-density layer.

2. The electrode of claim 1, wherein
a solid content of the at least one first high-density layer is about 90 volume percent to about 98 volume percent, based on a total volume of the at least one first high-density layer,
a solid content of the at least one second high-density layer is about 90 volume percent to about 98 volume percent, based on a total volume of the at least one second high-density layer, and
a solid content of the low-density layer is about 25 volume percent to about 50 volume percent, based on a total volume of the low density layer.

3. The electrode of claim 1, wherein an outermost one of the at least one second high-density layer has a greatest thickness among each layer of the at least one first high-density layer, each layer of the at least one second high-density layer, and each layer of the low-density layer.

4. The electrode of claim 1, wherein the at least one first high-density layer comprises a primary first high-density layer and a secondary first high-density layer,
the low-density layer comprises a first low-density layer between the primary first high-density layer and the secondary first high-density layer, and
the primary first high-density layer and the secondary first high-density layer have a same thickness or a different thickness.

5. The electrode of claim 4, wherein a thickness ratio of a thickness of the primary first high-density layer or the secondary first high-density layer to a thickness of each layer of the at least one second high-density layer is greater than about 1:1 and less than or equal to about 1:5.

6. The electrode of claim 1, wherein the at least one first high-density layer comprises a primary first high-density layer, a secondary first high-density layer, and a tertiary first high-density layer,
the low-density layer comprises a primary low-density layer between the primary first high-density layer and the secondary first high-density layer,
the low-density layer comprises a secondary low-density layer between the secondary first secondary first high-density layer and the tertiary first high-density layer, and
at least two of the primary first primary first high-density layer, the secondary first high-density layer, and the tertiary first high-density layer have a same thickness or a different thickness.

7. The electrode of claim 6, wherein a thickness ratio of a thickness of the primary first high-density layer, the secondary first high-density layer, or the tertiary first high-density layer to a thickness of each layer of the at least one second high-density layer is greater than about 1:1 and less than or equal to about 1:5.

8. The electrode of claim 1, wherein a thickness ratio of a total thickness of the at least one first high-density layer to a total thickness of the at least one second high-density layer is about 1.5:1 to about 1:6.

9. The electrode of claim 1, wherein a thickness ratio of a thickness of each first high-density layer of the at least one first high-density layer to a thickness of the low-density layer is about 1:0.1 to about 1:0.3.

10. The electrode of claim 1, wherein a thickness ratio of a thickness of each second high-density layer of the at least one second high-density layer to a thickness of each layer of the low-density layer is about 1:0.1 to about 1:0.3.

11. The electrode of claim 1, wherein the low-density layer comprises a single layer or a plurality of layers, and each low-density layer has a thickness of about 2 μm to about 5 μm.

12. The electrode of claim 1, wherein the low-density layer comprises at least one of a solid electrolyte, a liquid electrolyte, or an ionic liquid.

13. The electrode of claim 1, wherein the at least one first high-density layer and the at least one second high-density layer each independently has a porosity of about 1% to about 5%.

14. The electrode of claim 1, wherein the low-density layer has a porosity of about 25% to about 50%.

15. The electrode of claim 1, wherein each layer of the at least one first high-density layer has a thickness of about 8 μm to about 40 μm.

16. The electrode of claim 1, wherein each layer of the at least one second high-density layer has a thickness of about 10 μm to about 40 μm.

17. The electrode of claim 1, wherein the at least one second high-density layer comprises a primary second high-density layer and a secondary second high-density layer,
the low-density layer is between the primary second high-density layer and the secondary second high-density layer, and
the primary second high-density layer and the secondary second high-density layer have a same thickness or different thicknesses.

18. The electrode of claim 17, wherein a thickness ratio of a thickness of the primary second high-density layer or the secondary second high-density layer to a thickness of each layer of the low-density layer is about 1:0.1 to about 1:0.3.

19. The electrode of claim 1, wherein the at least one second high-density layer comprises a primary second high-density layer, a secondary second high-density layer, and a tertiary second high-density layer,
the low-density layer comprises a first low-density layer between the primary second high-density layer and the secondary second high-density layer, and a second low-density layer between the secondary second high-density layer and the tertiary second high-density layer, and
at least two of the primary second primary first high-density layer, the secondary second high-density layer, and the tertiary second high-density layer have a same thickness or different thicknesses.

20. The electrode of claim 19, wherein a thickness ratio of a thickness of the primary second high-density layer, the secondary second high-density layer, or the tertiary second high-density layer to a thickness of each layer of the low-density layer is about 1:0.1 to about 1:0.3.

21. The electrode of claim 1, wherein the active material structure has a plurality of channels extending in a thickness direction.

22. The electrode of claim 21, wherein the plurality of channels comprise at least one of a solid electrolyte, an ionic liquid, or a liquid electrolyte.

23. The electrode of claim 1, wherein the electrode is a sintered electrode having a relative density of about 85% to about 99%.

24. The electrode of claim 1, wherein a thickness ratio of a thickness of each first high-density layer of the at least one first high-density layer to a thickness of each second high-density layer of the at least one second high-density layer is about 1:2 to about 1:4.

25. The electrode of claim 1, wherein the active material structure has a plurality of channels extending in a thickness direction, and a plurality of low-density layers separated by the plurality of channels, and each layer of the plurality of low-density layers has a different composition.

26. A method of manufacturing an electrode for a secondary battery, the method comprising:

forming a structure by pressing a stack comprising providing at least one first high-density layer, a low-density layer, and at least one second high-density layer;

disposing the low-density layer between the at least one first high-density layer and the at least one second high-density layer to form a stack;

pressing the stack to form a structure;

sintering the structure to manufacture an active material structure; and disposing a current collector on the active material structure and proximate to the at least one first high-density layer to manufacture the electrode of claim 1.

27. The method of claim 26, further comprising, before the sintering, forming a plurality of channels extending in a thickness direction of the electrode.

28. The method of claim 26, wherein the sintering comprises sintering at a temperature of about 1000° C. to about 1300° C.

29. A secondary battery comprising:

a first electrode;

a second electrode on the first electrode; and a separator between the first electrode and the second electrode, wherein at least one of the first electrode or the second electrode is the electrode of claim 1.

30. The secondary battery of claim 29, wherein the first electrode is a cathode, and the second electrode is an anode.

31. The secondary battery of claim 29, wherein the secondary battery has a ratio of discharge capacity at 1C to a discharge capacity at 0.2C of about 90% to about 95%, an energy density of about 500 watt-hours per liter to about 605 watt-hours per liter, and a capacity retention after 400 charge-discharge cycles of about 88% to about 90%.

32. A cathode, comprising:

the electrode of claim 1, wherein at least one of the first high-density layer, the second high-density layer, or the low-density layer comprises a cathode active material.

\* \* \* \* \*